(12) United States Patent
Pearce

(10) Patent No.: US 8,789,843 B2
(45) Date of Patent: Jul. 29, 2014

(54) COLLAPSIBLE SUPPORT FRAME

(75) Inventor: Samuel Blackburn Pearce, Newark (GB)

(73) Assignee: Cosco Management, Inc., Wilmington, DE (US)

( * ) Notice: Subject to any disclaimer, the term of this patent is extended or adjusted under 35 U.S.C. 154(b) by 1361 days.

(21) Appl. No.: 12/496,428

(22) Filed: Jul. 1, 2009

(65) Prior Publication Data
US 2010/0001493 A1    Jan. 7, 2010

(30) Foreign Application Priority Data

Jul. 2, 2008   (GB) .................................. 0812104.8

(51) Int. Cl.
*B62B 7/06*        (2006.01)
*B62B 7/10*        (2006.01)

(52) U.S. Cl.
USPC ........... 280/650; 280/647; 280/47.4; 280/657

(58) Field of Classification Search
USPC ........ 280/62, 641–644, 646–650, 655, 47.38, 280/47.39, 47.4, 47.25, 657, 658; 297/16.1, 297/16.2
See application file for complete search history.

(56) References Cited

U.S. PATENT DOCUMENTS

| | | | | |
|---|---|---|---|---|
| 1,069,804 | A * | 8/1913 | Nordgren | 297/106 |
| 1,753,931 | A * | 4/1930 | Lewis | 280/644 |
| 2,607,605 | A * | 8/1952 | Walter | 280/644 |
| 3,123,400 | A * | 3/1964 | Paulson | 297/314 |
| 3,882,949 | A * | 5/1975 | Anderson | 180/8.2 |
| 4,294,464 | A * | 10/1981 | Ettridge | 280/649 |
| 5,601,302 | A * | 2/1997 | Beard et al. | 280/250.1 |
| 6,095,548 | A | 8/2000 | Baechler | |
| 8,366,139 | B2 * | 2/2013 | Kane | 280/647 |
| 2005/0060802 | A1 * | 3/2005 | Zhong | 5/120 |

FOREIGN PATENT DOCUMENTS

| | | |
|---|---|---|
| EP | 1366968 | 12/2003 |
| EP | 1466810 | 10/2004 |
| FR | 2407849 | 11/1977 |
| GB | 746265 | 3/1956 |

OTHER PUBLICATIONS

Search Report dated Aug. 7, 2008, for British Application GB0812104.8.

* cited by examiner

*Primary Examiner* — J. Allen Shriver, II
*Assistant Examiner* — Travis Coolman
(74) *Attorney, Agent, or Firm* — Barnes & Thornburg LLP

(57) ABSTRACT

A collapsible support frame particularly for an infant pushchair comprises in an erect configuration at least a centrally located elongate spine and a seating cavity within the support frame in which to receive a seat. The spine being coupled at or towards one end to a coupler and at or towards its other end to a handle assembly.

18 Claims, 17 Drawing Sheets

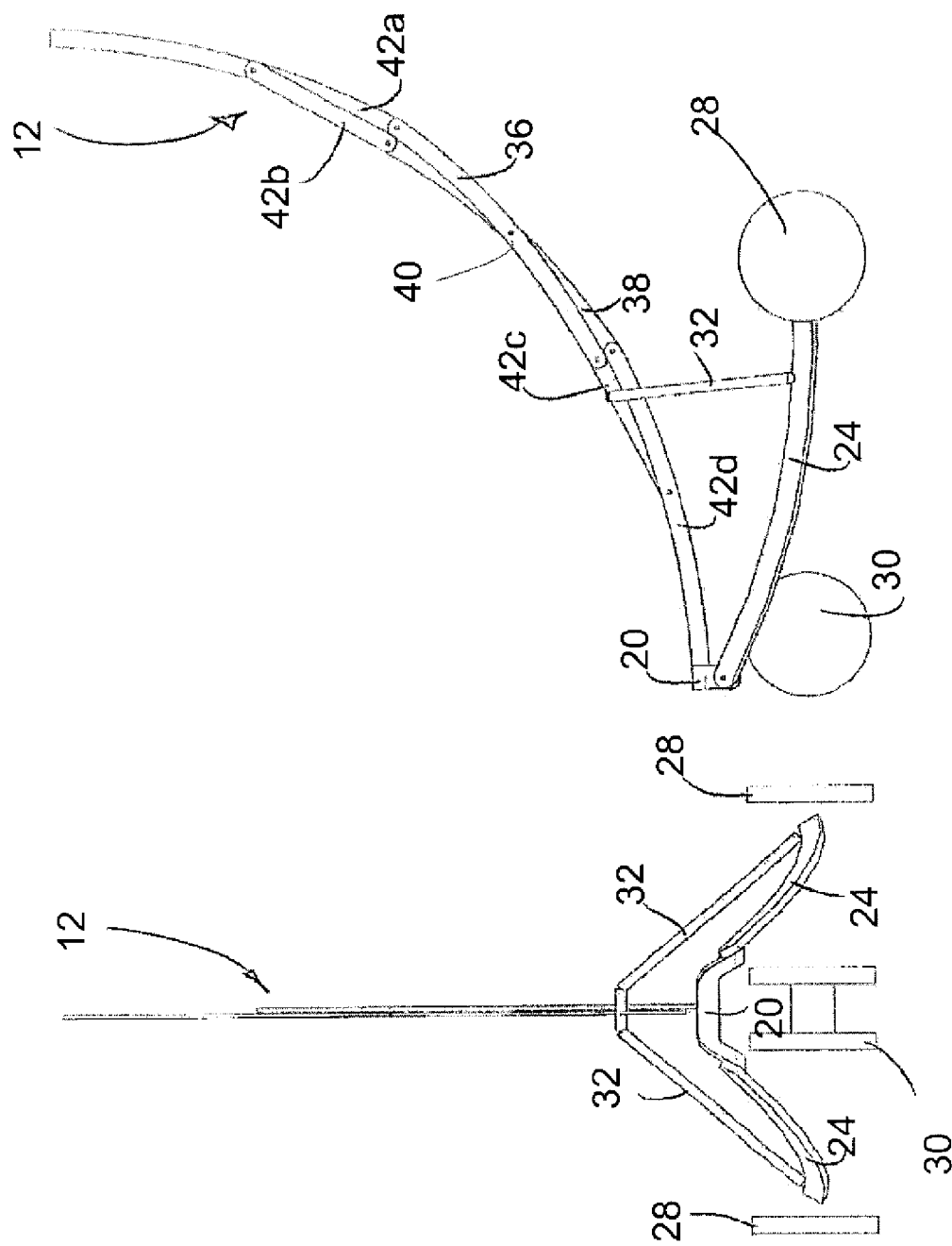

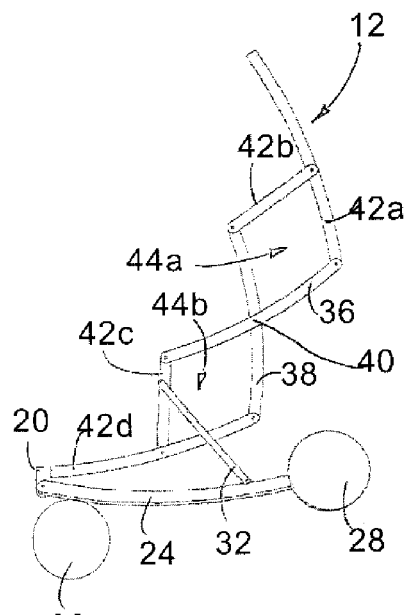
Fig. 4a
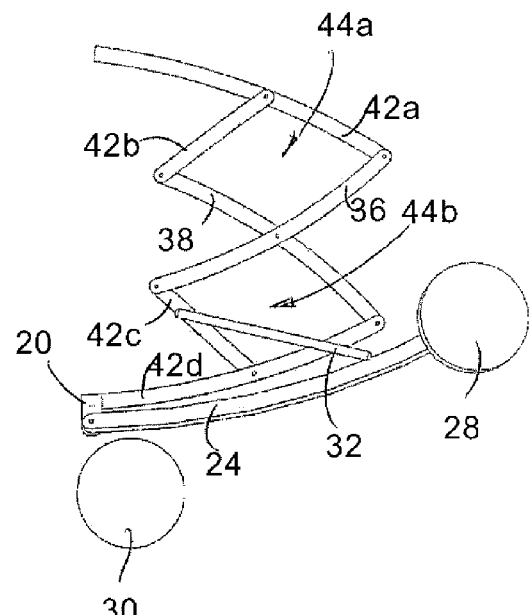
Fig. 4b
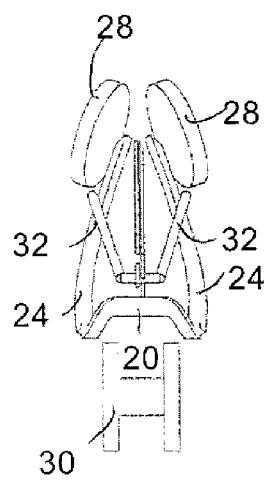
Fig. 4c
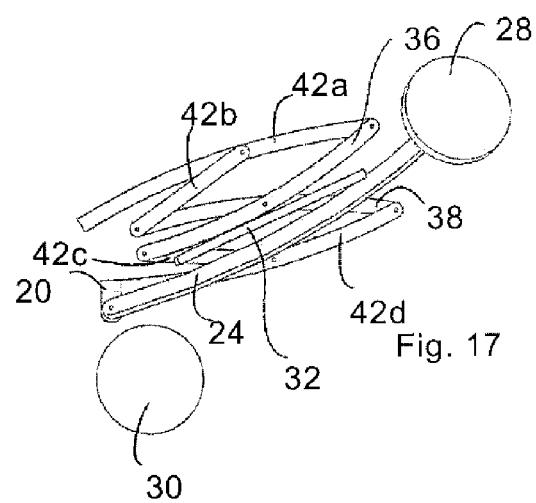
Fig. 17
Fig. 4d

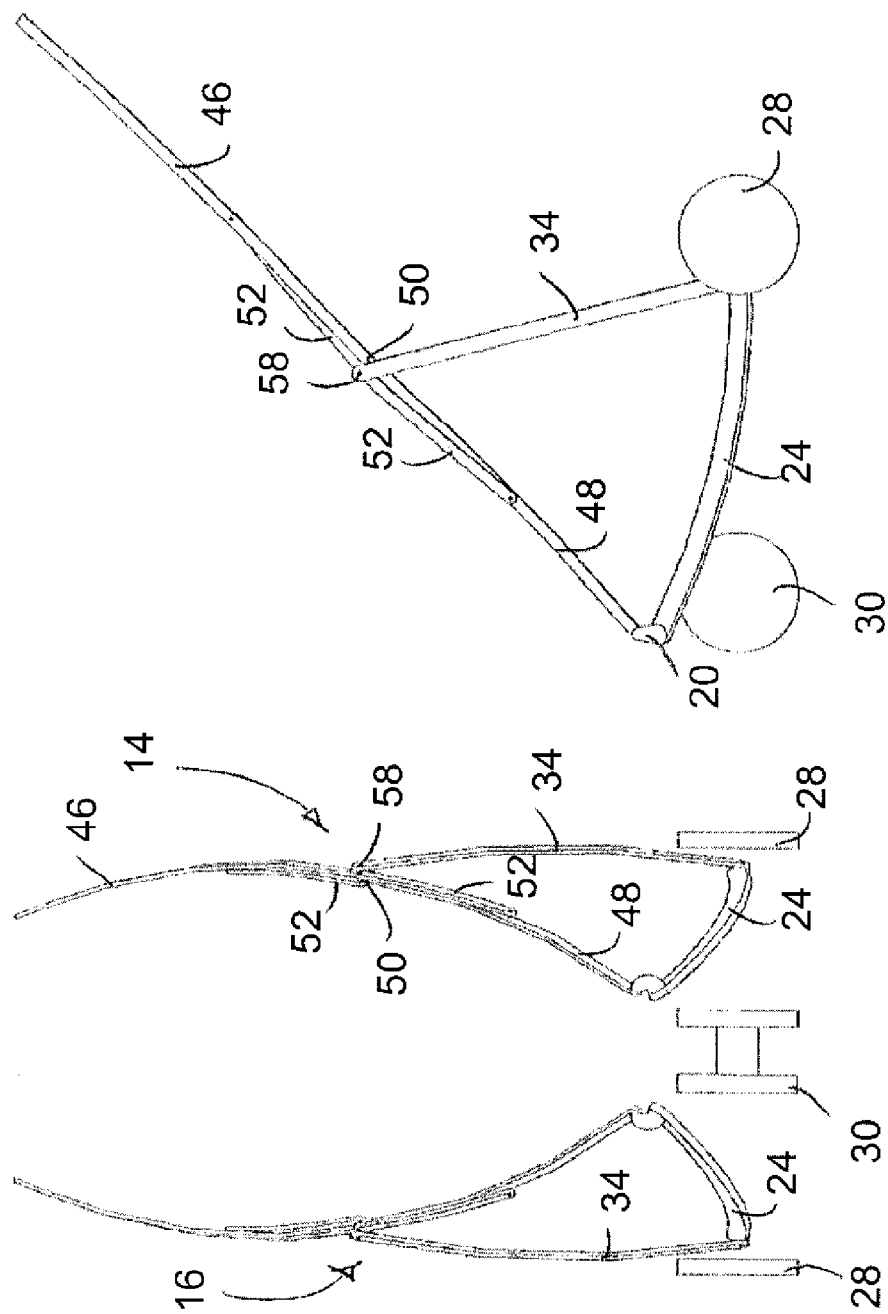

COLLAPSIBLE SUPPORT FRAME

BACKGROUND

The present disclosure relates to a collapsible support frame particularly for an infant pushchair, the support frame in an erect configuration comprises at least a centrally located elongate spine and a seating cavity within the support frame in which to receive a seat, the spine being coupled at or towards one end to a coupler and at or towards its other end to a handle assembly. The collapsible support frame is particularly, but not exclusively, a collapsible support frame for an infant pushchair.

Such a collapsible support frame, which is for example known from the international patent application WO 2008/054852, comprises a rigid straight spine with a slidable extension. This spine can not be folded to collapse.

Support frames find an application in a great variety of ways. Often it is desirable for a support frame to be collapsible such that it may be converted between erect and collapsed configurations as desired.

This aspect of support frames is beneficial in the case of a support frame that is of a size and renders it suitable for manipulation by a human user without, for example, motorized assistance. One particular example of a support frame of this general kind occurs in a pushchair or buggy designed for the purpose of conveying an infant.

It has for many years been known to provide such devices, which are of great utility to parents and other carers of infants, comprising a convertible framework defining a perimeter or a series of attachment points to which a flexible, typically textile, seat portion is secured.

The nature of the framework is such as to permit its conversion between erect and collapsed configurations. The attached seat portion, which typically is a padded sheet of a composite fabric material, by reason of its attachment also converts between collapsed and extended positions on conversion of the framework as aforesaid.

The ability to collapse the pushchair permits its ready storage and transportation.

Since pushchairs are manipulated by hand it is desirable for them to be light in weight. It is also desirable to be able to convert a pushchair of the kind outlined between the erect and collapsed configurations using essentially a one-handed process. This feature in pushchairs is strongly sought-after by manufacturers and designers since there is a perception that the pushchairs must be easy to use even when one hand of the user is occupied, for example, in carrying an infant or some of the paraphernalia that attends their care. A further, strongly desired feature of successful pushchair designs is that they must collapse to as small a size as possible in order to facilitate their transportation, for example, in the generally cramped load areas of modern hatchback cars yet when erect the pushchairs must be large enough safely to support an infant. This requirement for space efficiency is particularly acute in relation to the relative lengths of the pushchair when in its erect and collapsed configurations since it is often necessary to store the pushchair lying transversely in a vehicle boot. Consequently the overall length of the pushchair when collapsed must be considerably less than the width of the interior of a small car.

The stability of the pushchair in use is also very important. It is critical for the footprint of the in-use pushchair to be as large as possible so that the movements of an active child within the seat portion are insufficient to cause the pushchair to tip over. It therefore is very important that the erect-collapsed volume ratio of a pushchair is as large as possible in order to meet the twin design aims of compactness when collapsed and the generation of a large footprint when erect.

SUMMARY

The present disclosure provides a collapsible support frame that is particularly suited for use in an infant pushchair, which support frame is collapsible to a relatively small size.

This is accomplished with the collapsible support frame according to the present disclosure in that the spine comprises at least first and second, elongate, rigid spine members mutually interconnected at a pivot defining a moveable spine joint lying part-way along the length of at least one rigid spine member and, on at least one side of the moveable spine joint, subsidiary spine members each pivotably connected to one of the rigid spine members, the subsidiary spine members being pivotably secured together remote of the movable spine joint such that the spine defines at least one closed loop kinematic linkage being moveable between an erect configuration in which the rigid spine members and subsidiary spine members diverge and a collapsed configuration in which the rigid spine members and subsidiary spine members generally lie adjacent one another along their lengths, the connections of the rigid spine members and subsidiary spine members being such that the closed loop kinematic linkage is uniplanar.

In the erect configuration each rigid spine member and the subsidiary spine member pivotally connected thereto at a pivot point diverge, meaning that they extend in different directions from their pivot point. In the collapsed configuration each rigid spine member and the subsidiary spine member pivotably connected thereto extend in the same direction from the their pivot point.

The use of a spine in which there is defined at least one closed loop kinematic linkages allows the spine to collapse readily to a length that is roughly half of the length of the spine in its erect configuration.

The uniplanar nature of the kinematic linkage renders the spine highly suitable for use as one of the main structural component parts of a collapsible support frame for a pushchair since the motion of the kinematic linkage between the erect and collapsed configurations takes place in each case along the same line in the plane of the kinematic linkage. In addition, it further renders the support frame suitable for use in a one-handed operation since it results in a configuration in which it is not necessary to brace parts of the support frame one relative to another during the collapsing/erecting operations.

Illustratively the spine is curved. The use of a curved spine allows the creation of a seating cavity having a relatively large footprint within the support frame whilst having relatively compact dimensions to either side of the seating cavity. This assists in creating a support frame that is compact in its collapsed configuration.

Illustratively the spine members and subsidiary spine member are rigid so as to help to rigidify the spine when in its erect configuration.

One embodiment of the support frame according to the present disclosure is characterised in that the moveable spine joint lying part-way along the length of the first and second, elongate, rigid spine members and, on each side of the moveable spine joint, subsidiary spine members are pivotably connected to each of the rigid spine members, pairs of subsidiary spine members being pivotably secured together remote of the movable spine joint such that the spine defines first and second closed loop kinematic linkages lying respectively to either side of the moveable spine joint and is moveable between an erect configuration in which the rigid spine members and subsidiary spine members diverge and a collapsed configuration in which the rigid spine members and subsidiary spine members generally lie adjacent one another along their lengths, the connections of the rigid spine members and subsidiary spine members being such that the first and second closed loop kinematic linkages are uniplanar.

The use of a spine in which there are defined two adjacent, closed loop kinematic linkages allows the spine to collapse readily to a length that is roughly one third of the length of the spine in its erect configuration. More kinematic linkages will further reduce the length in its collapsed configuration.

Conveniently the first or second rigid spine member is bifurcated so as to extend on either side of the other rigid spine member in the vicinity of the moveable spine joint.

This is simple way of providing proximity of the first and second elongate rigid spine members in the vicinity of the spine joint so that the spine joint may be formed as a simple, robust arrangement.

Another embodiment of the support frame according to the present disclosure is characterised in that on a first side of the moveable spine joint first and second subsidiary spine members are respectively connected at one end to ends of the first and second rigid spine members and the opposite end of the second subsidiary spine member is pivotably connected to the first subsidiary spine member part-way along the length of the first subsidiary spine member and on a second side of the moveable spine joint third and fourth subsidiary spine members are respectively connected at one end to opposite ends of the first and second rigid spine members and the opposite end of the third subsidiary spine member is pivotably connected to the fourth subsidiary spine member part-way along the length of the fourth subsidiary spine member.

Due to the relatively long first and fourth subsidiary spine members, the spine will be relatively long in the erect configuration whilst in the collapsed configuration the spine members and the subsidiary spine members will be lie adjacent each other.

In order to provide simple robust arrangements, the subsidiary spine members may be bifurcated so as to extend on either side respectively of the other subsidiary spine members in the vicinity of the pivotal connections.

Illustratively the or each bifurcated spine member is bifurcated along substantially its entire length. This has advantages in terms of the ability pivotably to attach further members at locations along the bifurcated spine member. It also provides advantages in terms of the visual appeal of the support device as a whole, which is increasingly important since many purchasers of infant equipment make purchasing choices on the basis of aesthetics.

In order to lock the spine in its erect configuration, the first and second rigid spine members are illustratively curved such that, in the erect configuration of the spine, the pivotable interconnection defining the moveable spine joint is an over centre pivot joint. This arrangement automatically locks the spine in its erect configuration as will be described later in this disclosure until an external force is applied to move the moveable spine joint and thereby unlock the spine.

A further embodiment of the support frame according to the present disclosure is characterised in that the collapsible support frame comprises a flexible seat member secured to the handle assembly and the coupler so as to define a seat within the seating cavity in the erect configuration of the support frame.

Such a support frame is relatively simple and has a low weight. Only the spine is needed for holding the seat member. The flexible seat member illustratively consists of or includes a sheet of flexible, generally inelastic, fabric. In use a force will be exerted by the child sitting on the seat member. This force will push the handle assembly and coupler apart and pushes the support frame further in the erect position.

Yet a further embodiment of the support frame according to the present disclosure is characterised in that the support frame comprises seat link members each pivotably connected at or towards one end to the spine at a location between the coupler and the handle assemble and connected at or towards its other end to a side of the flexible seat member.

The seat link members will keep sides of the flexible seat member at a distance from each other so that a child can easily sit on the seat member. It will also prevent tilting of the seat member between the coupler and the handle assembly.

Yet another embodiment of the support frame according to the present disclosure is characterised in that the collapsed configuration of the support frame the seat link members are pivoted with respect to the spine to lie adjacent each other.

By doing so a compact folded pushchair will be obtained.

Another embodiment of the support frame according to the present disclosure is characterised in that the support frame comprises a pair of support arms extending from the coupler, each support arm carrying a wheel at or towards one end and being pivotably coupled to the coupler at its other end, the wheels in use of the support frame in its erect configuration being spaced from each other and providing ground engaging support below the seating cavity, wherein the spine is foldable and each support arm is linked to the spine such that the support frame is collapsible in a single movement from its erect configuration into a collapsed configuration in which the support arms are pivoted relative to the coupler to locate the wheels adjacent each other, and the spine is folded to lie adjacent the support arms.

The provision of a support frame collapsible into a collapsed configuration in which the support arms are pivoted relative to the coupler to locate the wheels adjacent each other results in a frame that is compact in its collapsed configuration.

Pivotable movement of each support arm relative to the coupler on movement of the support frame from its erect configuration to its collapsed configuration may be effected by the provision of elongate, rigid, spine link members, each spine link member being pivotably connected at one end to a respective support arm and at its other end to the spine.

The provision of a rigid spine link member pivotably connected between each support arm and the spine results in a mechanism that facilitates direct movement of the support arm relative to the coupler in response to movement of the spine relative to the respective support arm.

Illustratively each spine link member is pivotably connected between the spine and the respective support arm so as to pull the support arm towards the spine on movement of the spine from its erect configuration to its collapsed configuration and to push the support arm away from the spine on movement of the spine from its collapsed configuration to its erect configuration.

This arrangement provides relative movement between the spine and the support arms during movement of the support frame between its erect and collapsed configurations.

To ensure consistent movement of the support arms, on either side of the support frame, the spine link members may be fixedly interconnected via a direct link at the pivotable connections with the spine.

Yet another embodiment of the support frame according to the present disclosure is characterised in that the elongate spine is centrally located between, and coupled at or towards each end to a pair of elongate support limbs, the spine being coupled at or towards one end to the support limbs via the coupler and at or towards its other end to the support limbs via a handle assembly, wherein the spine and support limbs are foldable such that the support frame is collapsible in a single movement from its erect configuration into a collapsed configuration in which the spine and support limbs are folded to lie adjacent each other.

The provision of a support frame collapsible into a collapsed configuration in which the spine and support limbs are folded to lie adjacent each other and illustratively adjacent the support arms results in a frame that is compact in its collapsed configuration.

The provision of an illustratively curved spine and an illustratively curved support limbs, together with pivotable support arms linked to the spine and respective support limbs furthermore allows the support frame to collapse readily into its collapsed configuration, from its erect configuration, in a single movement. It also therefore renders the support frame suitable for use in a one-handed operation.

In order to facilitate folding of the support limbs, each support limb may include first and second, elongate, rigid limb members interconnected at a pivot defining a moveable limb joint and, on each side of the moveable limb joint, a subsidiary limb member pivotably connected to each of the rigid members part-way along the length of the respective rigid limb member, the subsidiary limb members being pivotably secured together such that each support limb defines a closed loop kinematic linkage and is moveable between an erect configuration in which the rigid and subsidiary limb members diverge and a collapsed configuration in which the rigid and subsidiary limb members lie adjacent one another along their lengths.

The use of a support limb in each of which there is defined a closed loop kinematic linkage allows each of the support limbs to collapse readily to a length that is roughly one half of the length of the support limb in its erect configuration.

Illustratively, in order to rigidify each of the support limbs when in its erect configuration, each subsidiary limb member is rigid.

Each of the rigid limb members may be bifurcated so as to extend on either side of the respective subsidiary limb members in the vicinity of the pivotal connections there between. As outlined above, this arrangement allows the provision of simple, robust, arrangements.

Illustratively in such embodiments each of the rigid limb members is bifurcated along substantially its entire length.

Illustratively each limb link member is pivotably connected between the respective support arm and the respective support limb so as to pull the support arm and support limb towards each other on movement of the support limb from its erect configuration to its collapsed configuration and to push the support arm and support limb away from each other on movement of the support limb from its collapsed configuration to its erect configuration.

This arrangement provides a mechanism for ensuring maximum reduction in size of the support frame in its collapsed configuration whilst ensuring the support limbs are spaced from the support arms and are maintained in such a spaced orientation in the erect configuration of the support frame.

To prevent accidental folding of each of the support limbs, a lock assembly may be operably associated with the spine and/or each of the support limbs to selectively lock the support frame in its erect configuration.

In embodiments where each support limb includes rigid and subsidiary limb members pivotably connected to define a closed loop kinematic linkage, the pivotable connections between the rigid limb members and between the subsidiary limb members of each support limb illustratively lie adjacent each other in the erect configuration of the respective support limb. This configuration allows the provision of a lock assembly including first and second releasably engageable lock elements, the first lock element being located at the pivotable connection between the first and second rigid limb members and the second lock element being located at the pivotable connection between the subsidiary limb members such that the lock elements co-operate on movement of the respective support limb into its erect configuration to releasably lock the support limb in its erect configuration.

Conveniently any lock assemblies operably associated with the spine and/or support limbs to selectively lock the spine and/or the support limbs in their erect configuration are operable via an actuator provided in the handle assembly to selectively release the lock assembly of the spine and/or each support limb.

This allows a user to quickly and easily disengage the lock assemblies when it is desirable to collapse the support frame into its collapsed configuration.

In order to allow for relative movement of the support limbs relative to the spine during folding of the spine and the support limbs, and to therefore reduce the risk of the support frame becoming jammed during movement between its erect and collapsed configurations, each of the support limbs may be pivotably connected to the coupler while the spine is fixedly coupled to the coupler.

As an alternative, or in addition, to the provision of rigid spine link members each support arm may be linked to a respective support limb by means of an elongate, rigid, limb link member pivotably connected at one end to the support arm and at its other end to the respective support limb.

The provision of a rigid limb link member also facilitates the transmission of movement directly from each support limb to the respective support arm in order to cause pivotable movement of the support arm relative to the coupler during folding movement of the support limb between its erect and collapsed configurations.

To further reduce the risk of the support frame becoming jammed and to allow for further relative movement between the spine and flexible seat and/or the support limbs, the support limbs and the spine may be pivotably coupled to the handle assembly.

In such embodiments the handle assembly may include a pair of elongate handle sections, each handle section being pivotably connected at one end of the spine and at its other end to the flexible seat and/or a respective support limb.

The handle sections in the erect configuration of the support frame define a handle for pushing and/or pulling the support frame and during movement of the support frame between its erect and collapsed configurations moves between erect and collapsed configurations of the handle assembly.

To provide free play between the support limbs and the handle sections, and therefore the spine, the pivotable connection between each handle section and the respective support limb illustratively defines at least two degrees of freedom of movement of the handle section relative to the support limb.

In such embodiments each handle section may be pivotably connected to the respective support limb by means of a ball joint.

As an alternative or in addition to a secondary wheel mounted on the coupler, the support frame may include a pair of secondary arms, the secondary arms being pivotably attached to each other at or towards one end and carrying a secondary wheel at or towards its other end. In such embodiments each secondary arm is pivotably attached at or towards its mid point to a respective one of the support arms such that, in use of the support frame in its erect configuration, the secondary wheels provide ground engaging support below the coupler and, on movement of the support frame from its erect configuration into its collapsed configuration, pivoting movement of the support arms relative to the coupler causes pivoting movement of each of the secondary arms relative to the respective support arm to locate the secondary wheels adjacent each other and locate each secondary arm adjacent the respective support arm.

This arrangement allows the provision of at least four wheels to provide ground engaging support during use of the support frame in its erect configuration, and thereby generate a relatively large footprint, whilst at the same time retaining the compactness of the support frame in its collapsed configuration.

In order to provide ground engaging support below the coupler in use of the support frame in its erect configuration, in addition to ground engaging support below the seating cavity, a secondary wheel may be mounted on the coupler.

In order to allow the support frame to be carried easily and readily in its collapsed configuration, the support frame may include a lock to selectively lock the support frame in its collapsed configuration.

The present disclosure is, as a consequence of the foregoing, considered to reside in a support frame as defined herein when configured as an infant pushchair.

BRIEF DESCRIPTION OF THE DRAWINGS

Illustrative embodiments of the present disclosure will now be described, by way of non-limiting examples, with reference to the accompanying drawings in which:

FIGS. 3A and 3B show front and side schematic illustrations of a spine of the support frame of FIG. 1 in an erect configuration;

FIGS. 4A to 4D show schematic illustrations of the spine of FIGS. 3A and 3B during movement from its erect configuration to a collapsed configuration;

FIGS. 5A and 5B show front and side schematic illustrations of support limbs of the support frame of FIG. 1 in an erect configuration;

DETAILED DESCRIPTION

FIGS. 1-8 show a first embodiment of a support frame 10 according to the present disclosure. The drawings show the support frame 10 of the present disclosure when configured as the collapsible frame of an infant pushchair. The drawings however omit a flexible seat member, described herein below, that would in a practice pushchair be present in order to provide a support for an infant. Similarly the drawings omit details of straps, clips and padded bumpers that may be part of or attached to such a seat member for the purpose of retaining an infant in the pushchair and protecting the infant against injuries that can sometimes arise from use of the device. These features are absent from the drawings purely for the purpose of improving the clarity of the representations herein. It is within the knowledge of the worker of ordinary skill in the relevant art to envisage details of a suitable seat member.

The support frame as shown includes a plurality of elongate members secured together by various pivotable joints.

In illustrative embodiments of the present disclosure the elongate members are manufactured from a lightweight, rigid, sturdy material such as extruded aluminium. Other materials, including a variety of metals, plastics, composite materials and even timber are also possible within the scope of the present disclosure. Aluminium is however preferred because it presents the combined attributes of cheapness, lightness, adequate rigidity when constructed in a framework, corrosion-resistance and ease of shaping. Typically in an illustrative embodiment of the present disclosure the majority of the elongate members are of circular or ovaloid cross-section, although other cross-sectional shapes (that need not be regular) are also possible.

Figure 1:
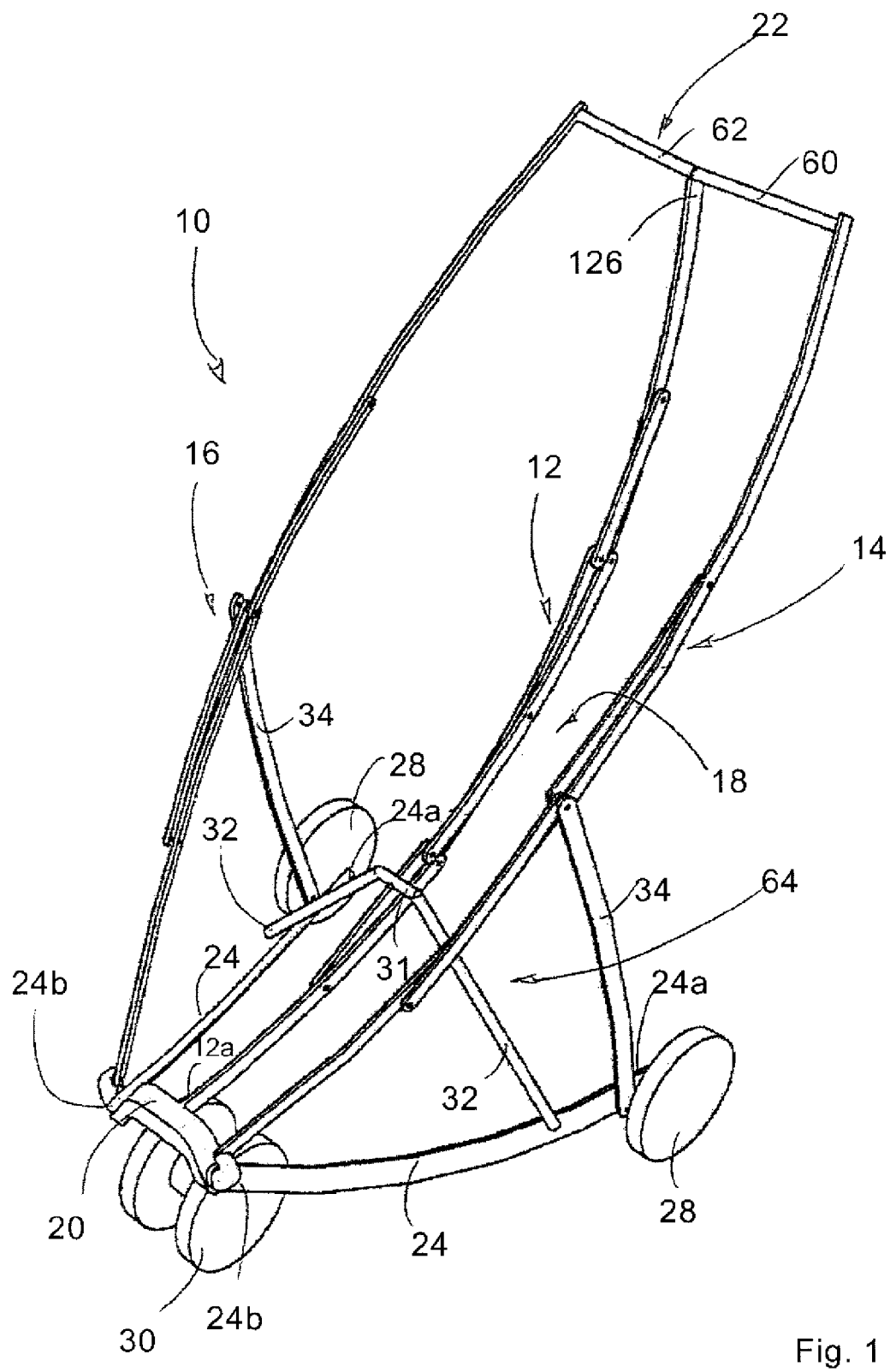
FIG. 1 shows a collapsible support frame according to a first embodiment of the present disclosure in an erect configuration.
Figure 9A:
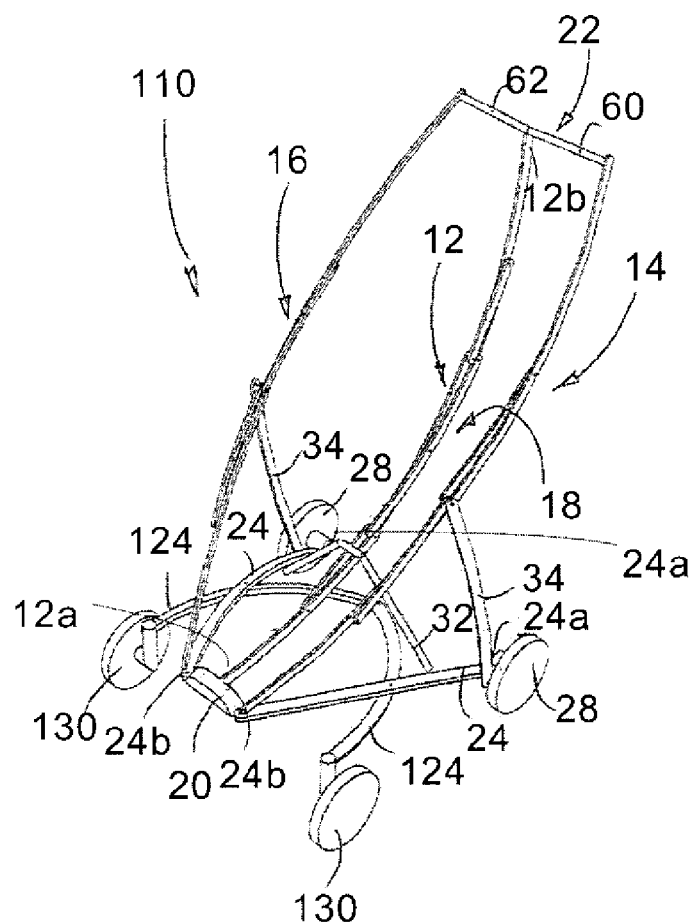
FIGS. 9A and 9B show a support frame according to a second embodiment of the present disclosure in an erect configuration.
Figure 9B:
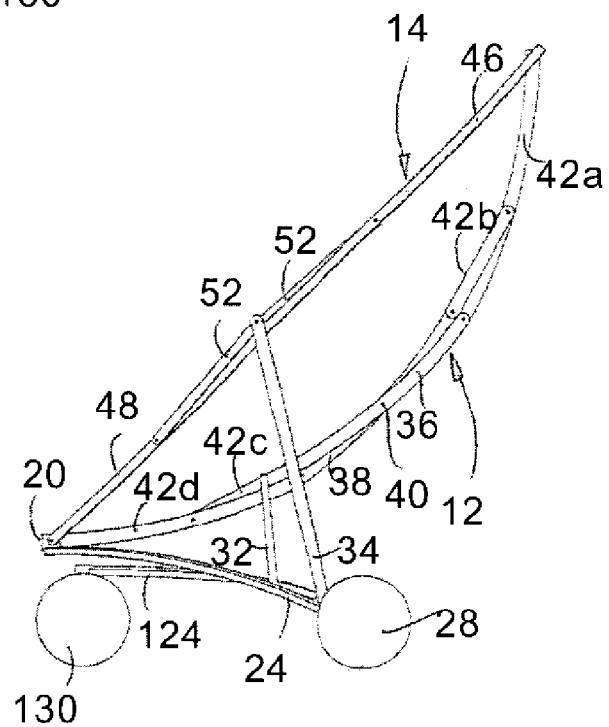
Figure 10:
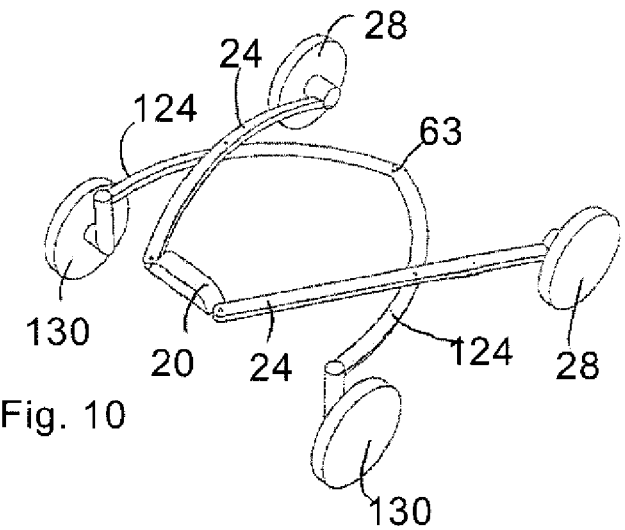
FIG. 10 shows a schematic illustration of support arms and secondary arms of the support frame of FIGS. 9A and 9B in an erect configuration.
Figure 11A:
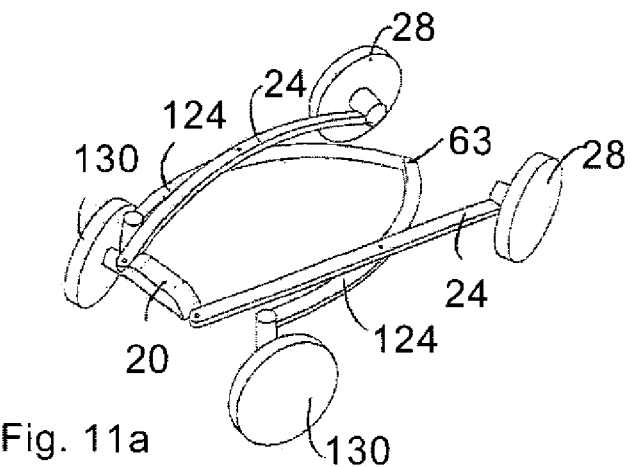
FIGS. 11A and 11B show schematic illustrations of the support arms and secondary arms of FIG. 10 during movement from their erect configuration to a collapsed configuration.
Figure 11B:
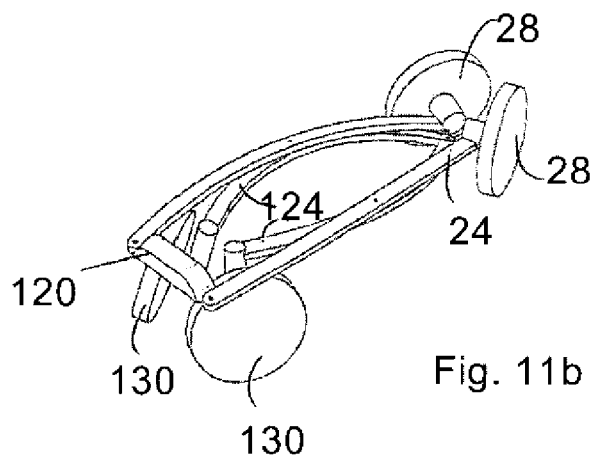
Figure 12:
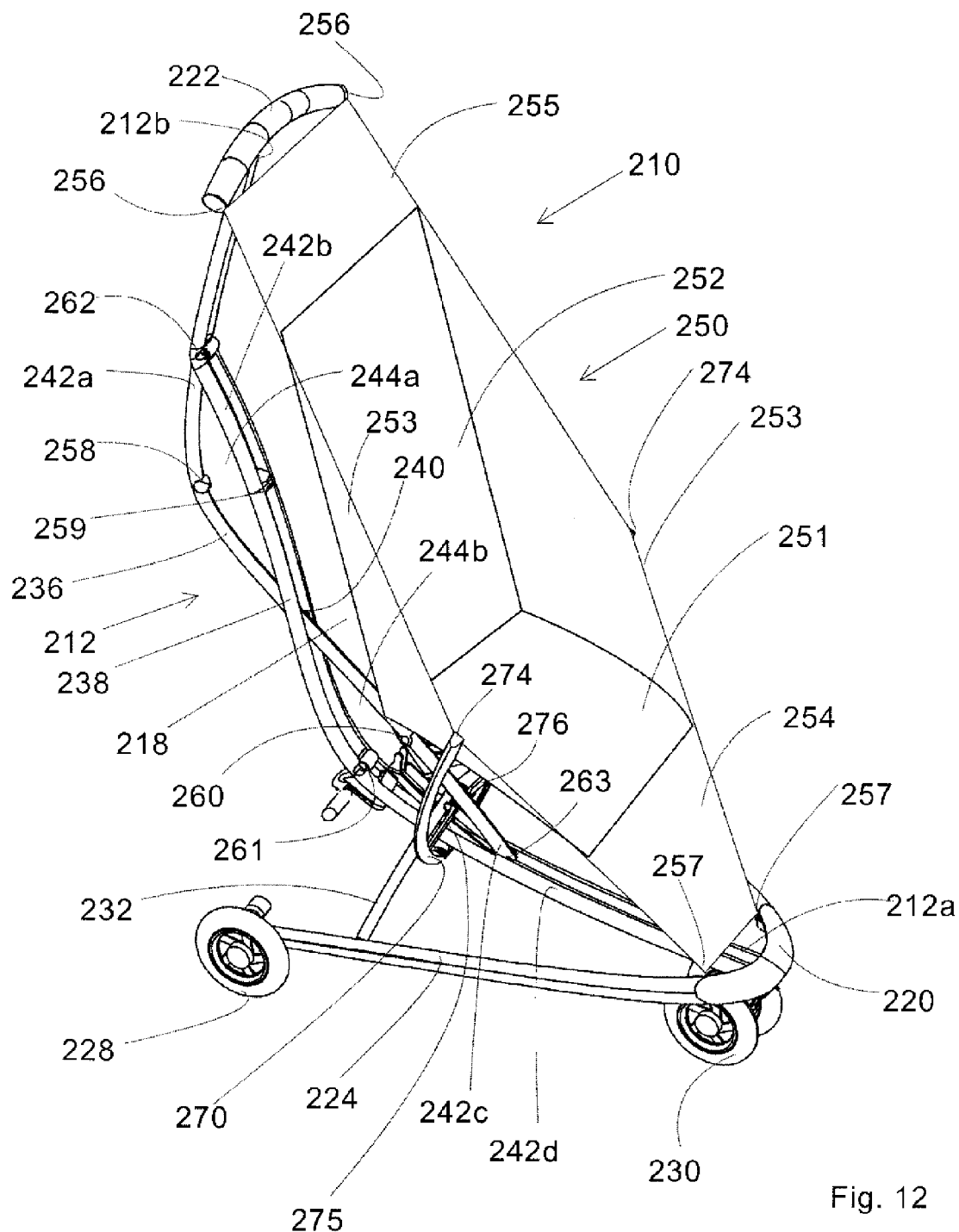
FIG. 12 show a perspective view of a support frame with seat member according to a third embodiment of the present disclosure in an erect configuration.

FIGS. 2 to 8 are intended to show parts of the support frame that is shown in FIG. 1, FIGS. 10 to 11 are intended to show parts of the support frame that is shown in FIGS. 9A and 9B and FIGS. 13 to 16 are intended to show parts of the support frame that is shown in FIG. 12. FIGS. 2 to 8 therefore variously omit certain features that are visible in FIG. 1, FIGS. 10 to 11 variously omit certain features are visible in FIGS. 9A and 9B and FIGS. 13 to 16 variously omit certain features are visible in FIG. 12. Such omission is primarily for the purpose of improving clarity in the drawing figures.

Referring to the drawings, a collapsible support frame 10 according to an embodiment of the present disclosure is shown in FIG. 1 in an erect configuration.

The support frame 10 includes an elongate spine 12 centrally located between, and coupled at each end to, a pair of opposed, elongate support limbs 14,16, the spine 12 and the support limbs being curved to define a seating cavity 18 within the support frame 10 in which to receive a seat.

The spine 12 is fixedly coupled at one end 12a to a coupler 20 and each of the support limbs 14,16 is pivotably coupled to the coupler 20 via pivot joints formed on the coupler 20. The spine 12 is therefore coupled at one end to each of the support limb 14,16 via the coupler 20, which in the embodiment shown in FIG. 1 is a moulded plastic block. The spine 12 is coupled at its other end 12b to the support limbs 14,16 via a handle assembly 22.

The support frame 10 also includes a pair of support arms 24 extending from the coupler 20, each support arm 24 carrying a wheel 28 at one end 24a and being pivotably coupled to the coupler 20 at its other end 24b.

In an erect configuration of the support frame 10, as is shown in FIG. 1, the support arms 24 are located relative to the coupler 20 so as space the wheels 28 from each other and provide ground engaging support below the seating cavity 18.

The spine 12 and the support limbs 12,14 are foldable and each support arm 24 is linked to the spine 12 and a respective one of the support limbs 14,16 such that the support frame 10 is collapsible in a single movement from its erect configuration into a collapsed configuration (FIG. 2C) as will be described later.

The support frame 10 shown in FIG. 1 also includes a secondary wheel 30 mounted on an underside of the coupler 20, which provides in use of the support frame 10 in its erect configuration, ground engaging support below the coupler 20.

Each of the support arms 24 is linked to the spine 12 by means of an elongate, rigid, spine link member 32 that is pivotably connected at one end to the support arm 24 and at its other end to the spine 12. The spine link members 32 are fixedly connected to each other at the pivotable connections with the spine 12 via a link 31 extending through the spine 12.

Each of the support arms 24 is also linked to a respective one of the support limbs 14,16 by means of an elongate, rigid, limb link member 34 that is pivotably connected at one end to the support arm 24 and at its other end to the respective support limb 14,16.

Figure 2A:
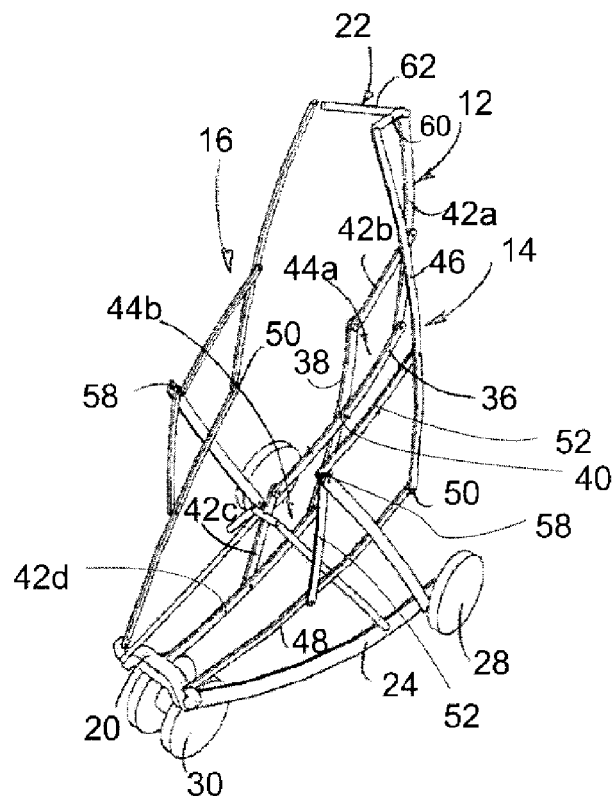
FIGS. 2A to 2C show the collapsible support frame of FIG. 1 during movement from its erect configuration to a collapsed configuration.
Figure 2B:
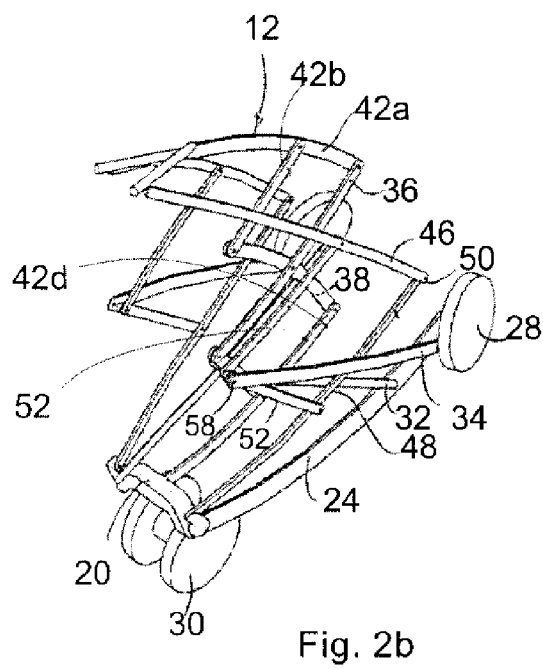
Figure 2C:
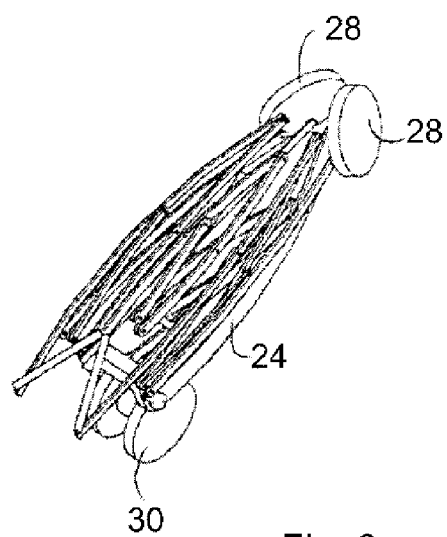

Referring to FIGS. 2A and 4A the spine 12 includes first and second, elongate, rigid spine members 36,38 mutually interconnected at a pivot defining a moveable spine joint 40 lying part-way along the length of each rigid spine member 36,38.

It is envisaged that in other embodiments not shown in the figures the first, elongate, rigid spine member 36 may be constituted by two spaced, parallel, rigid, sub-members such that the first rigid spine member 36 is bifurcated along its whole length and especially in the vicinity of the moveable joint 40.

In this region at least, and in practice along the length of the first rigid spine member 36, the spacing between members in such embodiments is slightly greater than the (typically circular or ovaloid) diameter of the second rigid spine member 38 such that, when augmented as necessary by appropriate spacers made e.g. from moulded nylon or a similar material, the moveable joint 40 may be constituted by a simple pivot pin that is fixed at either end to one of the sub-members and interconnects them so as to pass through an aperture extended from one side of the second elongate rigid spine member 38 to the other in order to define a pivotable joint of per se known construction.

Referring to FIGS. 2A and 4A, each of the elongate, rigid spine members 36,38 has pivotably connected thereto on each side of the moveable joint 40 a subsidiary spine member 42. Adjacent pairs of the subsidiary spine members 42a-42d are pivotably secured together such that the spine 12 defines first 44a and second 44b closed loop kinematic linkages that are most easily seen in FIGS. 4A and 4B.

In particular, on a first side of the moveable spine joint 40 first and second subsidiary members 42a,42b are respectively connected at one end to ends of the first and second rigid spine members 36,38 and the opposite end of the second subsidiary spine member 42b is pivotably connected to the first subsidiary spine member 42a part-way along the length of the first subsidiary spine member 42a.

On a second side of the moveable spine joint 40 third and fourth subsidiary spine members 42c,42d are respectively connected at one end to the opposite ends of the first and second rigid spine members 36,38 and the opposite end of the third subsidiary spine member 42c is pivotably connected to the fourth subsidiary spine member 42d part-way along the length of the fourth subsidiary spine member 42d.

The pivotable connections of the subsidiary spine members 42a-42d to the elongate rigid spine members 36,38 and to one another as appropriate are such that the movements of the members of the respective kinematic linkages 44a,44b are essentially uniplanar (subject to minor deflections caused by tolerancing of the pivotable joints and connections).

As best seen in FIGS. 4A and 4B the kinematic linkages 44a,44b lie respectively on opposite sides of the moveable joint 40. As a consequence the spine 12 is convertible between an erect configuration as shown in FIG. 3B via a partly collapsed configuration shown in FIGS. 4A and 4B to a fully collapsed configuration as shown in FIGS. 4C and 4D.

Thus in the collapsed configuration of the spine the rigid and subsidiary spine members lie generally parallel to and adjacent one another along their lengths as far as this is permitted by the shapes of the members and the positions of the various pivotable joints and connections.

In the erect configuration of the spine the latter defines an extended arrangement as shown in FIGS. 3A and 3B.

Referring to FIGS. 4A and 4B it can be seen that each of the elongate, rigid, spine link members 32 is pivotably connected at one end to the respective support arm 24 and at its other end to the third subsidiary spine member 42c of the spine.

In other embodiments not shown in the figures, the first and fourth subsidiary spine members 42a,42d may be each constituted by two spaced, parallel, rigid, sub-members in a similar manner to that described in relation to the first, elongate, rigid spine member 36 such that the first and fourth subsidiary spine members 42a,42d are bifurcated along their whole length and especially in the vicinity of the respective joints between the first and fourth subsidiary spine members 42a, 42d and the second and third subsidiary spine members 42b, 42c. This allows the use of a pivotable joint of per se known construction between the first and second subsidiary members 42a,42b and between the third and fourth subsidiary members 42c,42d, as outlined above in relation to the first rigid spine member 36.

Referring to FIG. 3B, each of the rigid spine members 36,38 is curved such that, in the erect configuration of the spine 12, the pivotable interconnection defining the moveable spine joint 40 is an over centre pivot and automatically locks the spine 12 in its erect configuration.

As can be seen from FIG. 3B, the moveable spine joint 40 in the erect condition of the spine 12 is offset towards the support arms. This relative position of the moveable spine joint 40 retains the spine 12 in its erect configuration essentially regardless of the downward force exerted by the masses of the various components of the support frame 10 and any loads supported thereby. Indeed any downward load applied to the spine will further resist the upward movement of the moveable joint 40 that is required to unlock the spine 12 and initiate movement of the kinematic linkages 44a,44b towards the collapsed configuration of the spine 12.

Each of the first and fourth subsidiary spine members 42a, 42d is also curved to define the curved shape of the spine 12 in its erect configuration.

In this particular embodiment, as can be seen from FIGS. 4A and 4B, each of the second and third subsidiary spine members 42b,42c is straight. It is envisaged in other embodiments however that these subsidiary spine members may also be curved.

Figure 6A:
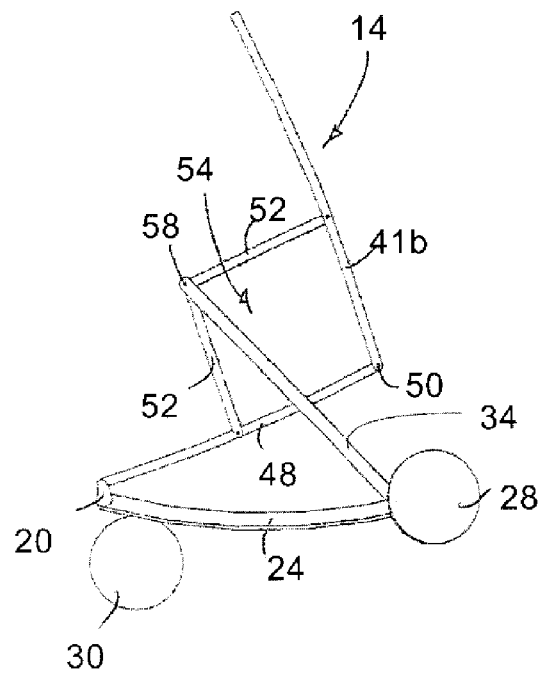
FIGS. 6A to 6D show schematic illustrations of the support limbs of FIGS. 5A and 5B during movement from their erect configuration to a collapsed configuration.

As best seen in FIG. 6A, each of the support limbs 14,16 includes first and second elongate, rigid, limb members 46,48 interconnected at a pivot defining a moveable limb joint 50.

On each side of the moveable limb joint 50, a subsidiary limb member 52 is pivotably connected to each of the first and second rigid limb members 46,48 part-way along the length of the respective rigid limb member 46,48. The subsidiary limb members 52 are pivotably secured together such that each support limb 14,16 defines a closed loop kinematic linkage 54 that is most easily seen in FIGS. 6A and 6B. As a consequence each of the support limbs 14,16 is convertible between an erect configuration as shown in FIGS. 5A and 5B via a partly collapsed configuration shown in FIGS. 6A, 6B and 6C to a fully collapsed configuration as shown in FIG. 6D.

Thus in the collapsed configuration of each support limb 14,16 the rigid and subsidiary limb members lie generally parallel to and adjacent one another along their lengths as far as this is permitted by the shapes of the members and the positions of the various pivotable joints and connections.

In the erect configuration of each support limb 14,16 the latter defines an extended arrangement as shown in FIGS. 5A and 5B.

Figure 6B:
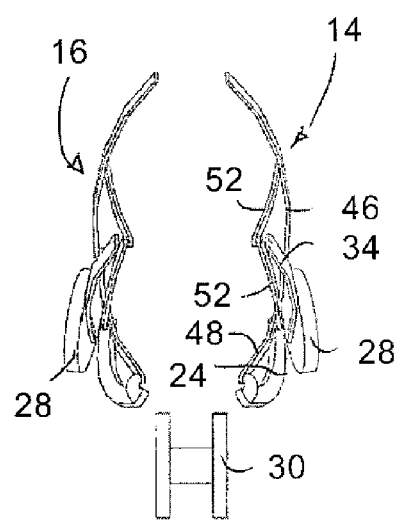

Referring to FIGS. 6A and 6B it can be seen that each of the elongate, rigid, limb link members 34 is pivotably connected at one end to the respective support arm 24 and at its other end to the pivotable connection between the subsidiary limb members 52 of the respective support limb 14,16.

In other embodiments not shown in the figures, the first and second rigid limb members 46,48 may be each constituted by two spaced, parallel, rigid, sub-members in a similar manner to that described above in relation to the first, elongate, rigid spine member 36 such that the first and second rigid limb members 46,48 are bifurcated along their whole length and especially in the vicinity of the respective joints between the subsidiary limb members 52. This allows the use of a pivotable joint of per se known construction between the second rigid limb member 48 and the respective subsidiary limb member 52.

The other of the subsidiary limb members 52 that is pivotably connected to the first rigid limb member 46 may also consist of two spaced, parallel, rigid, sub-members such that the subsidiary limb member is bifurcated along its whole length and especially in the vicinity of the pivotable joints between it and the other subsidiary limb member and the first rigid limb member 46. This allows the use of a pivotable joint of per se known construction between the two subsidiary limb members 52 and between the bifurcated limb member 52 and the first rigid limb member 46.

In the embodiment shown all of the subsidiary spine and limb members 42,52, that assist to define the kinematic linkages 44a,44b,54 are rigid. It is however possible to envisage embodiments of the support frame of the present disclosure in which the subsidiary members are flexible and are rigidified on erection of the collapsible support frame by other members. The use of rigid subsidiary members that are secured by pivots at their ends are however preferred not least of their ease and cheapness of manufacture.

Referring to FIGS. 5A and 6B, it can be seen that each of the rigid limb members 46,48 and the subsidiary limb members 52 of each support limb 14,16, and the limb link member 34 pivotably connected to the respective support limb 14,16 are curved.

In particular, in the erect configuration of each support limb 14,16, the rigid and subsidiary limb members 46,48,52 of the support limb 14,16 and the limb link member 34 pivotably connected thereto, define arcs on a common spherical surface.

In the erect condition of each support limb 14,16, the axes of the pivotable connections between the component members of the support limb and the limb link member 34 pivotably connected thereto each extend through the centre of origin of the common spherical surface of the support limb 14,16.

This configuration has been found to provide an arrangement that permits the formation of a curved support limb that moves easily and readily between its erect and collapsed configurations and in which the risk of any of the components impeding the movement of any of the other components is significantly reduced.

In the embodiment shown in FIG. 1, each of the support arms 24 also defines an arc, the radius of curvature of which passes through the centre of origin of the common spherical surface of the support limb 14,16 to which it is connected.

Referring to FIGS. 1 and 2A, the lengths of the rigid and subsidiary limb members 46,48,52 and the relative positions of the pivotable connections therebetween, of each support limb 14,16, means that, in the erect configuration of the support limb 14,16, the pivotable connections between the rigid limb members 46,48 and the subsidiary limb members 52 of the support limb 14,16 lie adjacent each other.

In order to retain each of the support limbs 14,16 in its erect configuration, and prevent unwanted movement of the support limb 14,16 from its erect configuration to its collapsed configuration, each support limb 14,16 includes a lock assembly (not shown).

The lock assembly includes first and second releasably engageable lock elements, the first lock element being located at the pivotable connection 50 between the rigid limb members 46,48 of the support limb and the second lock element being located at the pivotable connection 58 between the subsidiary limb members 52 of the support limb.

The first and second lock elements co-operate on movement of the support limb into its erect configuration to releasably lock the support limb in its erect condition.

The first and second lock elements of each lock assembly illustratively include snap-fittingly engageable members that are disengageable manually by pulling the pivotable connections apart.

In other embodiments, it is envisaged that an actuator may form part of the handle assembly 22 that permits remote release of the lock assembly of each support limb in order to permit movement of each of the support limbs from its erect configuration to its collapsed configuration.

Referring to 1, 2a, 7 and 8, the handle assembly 22 includes a pair of elongate handle sections 60,62.

Each handle section 60,62 is pivotably connected at one end to an upper end 12b of the spine 12 and at its other end to a respective support limb 14,16.

The pivotable connections between each of the handle sections 60,62 allows movement of each of the support limbs 14,16 relative to the spine 12 during movement of the support frame 10 between its erect and collapsed configurations.

The pivotable connection between each of the handle sections 60,62 and the respective support limb 14,16 allows two degrees of freedom of movement of the handle section 60,62 relative to the support limb 14,16.

In use, a flexible seat member may be secured to the support limbs 14,16 of the support frame 10 at a number of locations so as to locate a seat within the seating cavity 18 in the erect configuration of the support frame 10.

The load of an infant seated in the seat acts directly on the support limbs 14,16. This load is however transmitted via the limb link members 34 to the support arms 24 and via the handle sections 60,62 to the spine 12. The load is therefore distributed across the entire support frame 10.

The directionality of the load acts in an opposite direction to the forces required to unlock the lock assemblies of the support limbs 14,16 and the moveable joint 40 of the spine 12.

The support frame 10 further defines a stowage cavity 64 (FIG. 1) between the seating cavity 18 and the support arms 24. The positioning of the stowage cavity 64 relative to the seating cavity 18, the support arms 24 and the wheels 28 means that any load applied to the support frame 10 from items stowed in the stowage cavity not only acts to lower the centre of gravity of the support frame but is located close to the centre of gravity such that any de-stabilising effect arising from articles stowed in the stowage cavity is minimized.

In order to collapse the support frame 10 from its erect configuration (FIG. 1) to its collapsed configuration (FIG. 2C), a user must pull apart the pivotable connections of each support limb 14,16 so as to disengage the lock elements of the respective lock assembly (FIG. 2A). The user must also pull the moveable spine joint 40 upward, away from the support arms 34 in order to unlock the spine 12.

These unlocking movements commences movement of the spine 12, and each of the support limbs 14,16, from its erect configuration to its collapsed configuration, which in turn causes movement of the support limbs 14,16 relative to the spine 12 and therefore causes pivotable movement of the handle sections 60,62 relative to the spine 12.

Further movement of the support frame 10 from its erect configuration to its collapsed configuration may be achieved by pushing the pivotal connection between the spine 12 and the handle sections 60,62 toward the coupler 20, which may be effected in a one-handed operation.

The pivotable connections between the individual components of the spine 12 and each of the support limbs 14,16, as well as the pivotable connections between the support limbs 14,16 and the handle sections 60,62 and between the support limbs 14,16 and the coupler 20 means that the support frame moves to its collapsed configuration in a single movement.

The rigid connections between the spine 12 and the support arms 24 and between each support limb 14,16 and the respective support arm 24 means that movement of the spine 12 and the support limbs 14,16 from their erect configurations to their collapsed configurations, results in pivoting movement of the support arms 24 relative to the coupler 20.

In particular, referring to FIGS. 4A and 4B, it can be seen that during movement of the spine 12 from its erect configuration to its collapsed configuration, the pivotable connection between each of the spine link members 32 moves towards the coupler 20.

Due to the rigid nature of each spine link member 32, this relative movement of the pivotable connection necessarily results in movement of the pivotable connection between the other end of the spine link member 32 and the respective support arm 24 relative to the coupler 20 so as to maintain the distance separating the pivotable connections at either end of the spine link member 32 constant.

This in turn results in pivotal movement of the support arm 24 relative to the coupler 20 and moves the wheel 28 carried thereon towards the wheel 28 carried on the other support arm 24.

This relative movement results in the support arm 24 being pulled towards the spine 12 so that the support arm 24 lies adjacent the spine 12 in its collapsed configuration.

Figure 6C:
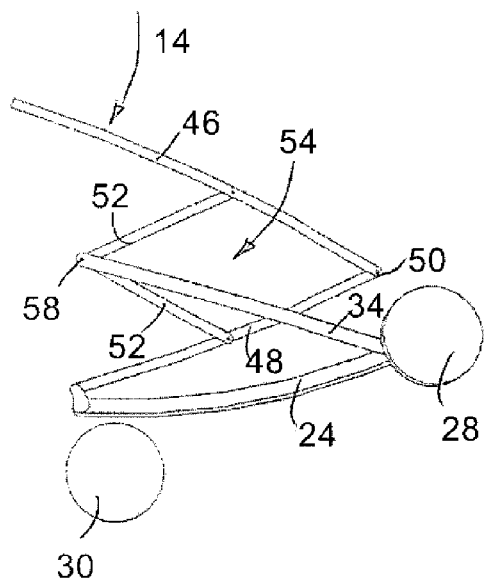
Figure 6D:
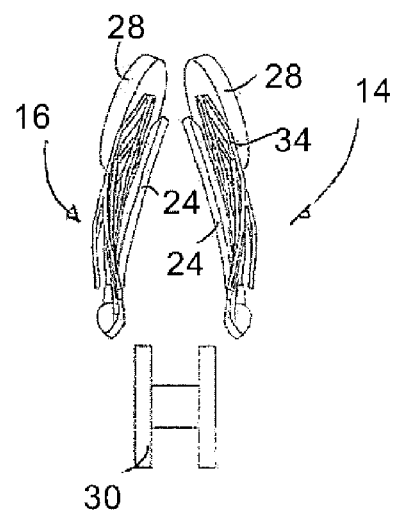
Figure 7:
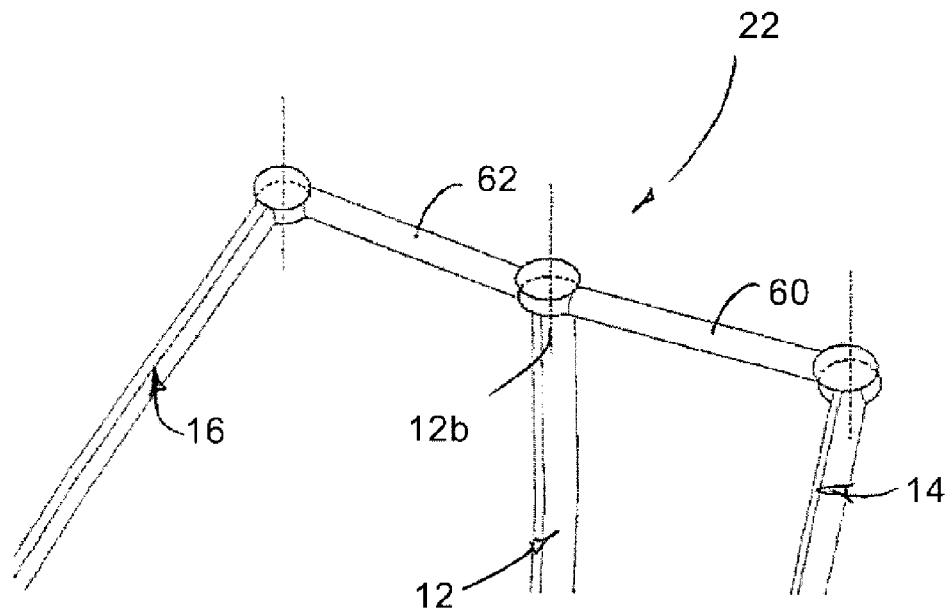
FIG. 7 shows a schematic illustration of a handle assembly of the support frame of FIG. 1 in an erect configuration.
Figure 8:
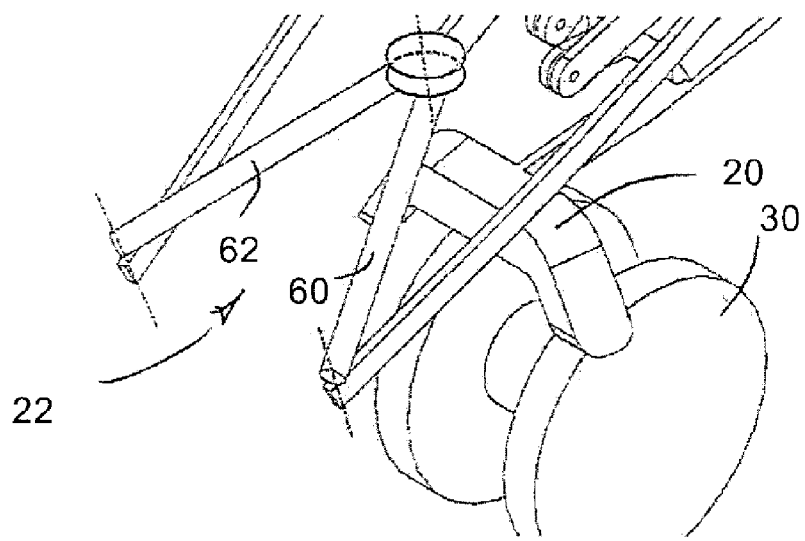
FIG. 8 shows a schematic illustration of the handle assembly of FIG. 7 in a collapsed configuration.

Referring also to FIGS. 6A and 6C, it can be seen that during movement of each of the support limbs 14,16 from its erect configuration to its collapsed configuration, the pivotal connection between each of the support limbs 14,16 and the respective limb link member 34 moves towards the coupler 20.

Due to the rigid nature of each limb link member 34, this relative movement of the pivotable connection necessarily results in movement of the pivotable connection between the other end of the limb link member 34 and the respective support arm 24 relative to the coupler 20 so as to maintain the distance separating the pivotable connections at either end of the limb link member 34 constant.

This in turn combines with the driving force provided by the spine link member 32 and results in pivotal movement of the support arm 24 relative to the coupler 20 and moves the wheel 28 carried thereon towards the wheel 28 carried on the other support arm.

This relative movement results in the support arm 24 being pulled towards the respective support limb 14,16 so that the support arm 24 lies adjacent the support limb 14,16 in its collapsed configuration.

As is apparent readily from FIGS. 4A and 4B, in the collapsed configuration of the spine 12, the rigid and subsidiary spine members 36,38,42a-42d lie generally parallel to and adjacent one another along their lengths as far as this is permitted by the shapes of the members and the positions of the various pivotable joints and connections. This results in a reduction in the length of the spine 12 to one third of its length in its erect configuration.

As is also readily apparent from FIGS. 6A and 6B, in the collapsed configuration of each support limb 14,16, the rigid and subsidiary limb members 46,48,52 lie generally parallel to and adjacent one another along their lengths as far as this permitted by the shapes of the members and the positions of the various pivotable joints and connections. This results in a reduction in the length of each support limb 14,16 to one half of its length in its erect configuration.

In the collapsed configuration of the support frame 10 the spine and limb link members 32,34 act to retain the support arms 24 in position relative to the collapsed spine 12 and the collapsed support limbs 14,16.

During movement of the support frame 10 from its collapsed configuration to its erect configuration, the relative movements of the pivotable connections between the spine 12, support limbs 14,16, spine link members 32 and limb link members 34 is reversed.

Consequently, the spine link members 32 act to push the support arms 24 away from the spine 12 and the limb link members 34 act to push the support arms 24 away from the support limbs 14,16.

In the erect configuration of the support frame 10, the spine and limb link members 32,34 act to maintain the relative positions of the erect spine 12, the erect support limbs 14,16 and the support arms 24.

The provision of the link 31 fixedly interconnecting the spine link members 32 ensures that any movement of one of the spine link members 32 relative to the spine 12 is results in corresponding movement of the other of the spine link members 32 on the opposite side of the spine 12.

This ensures consistent movement of the support arms 24 on each side of the spine 12 during movement between the erect and collapsed configurations of the support frame 10. However it also ensures that in the event of one of the support arms 24 being prevented from moving relative to the spine 12, due to an obstruction for example, movement of the other support arm 24 is also prevented. This in turn, due to the interaction between the support arms 24 and the support limbs 14,16, prevents relative movement of all components within the support frame 10 until the obstruction is removed. Consequently, the support frame 10 cannot be moved to its erect configuration unless both support arms 24 are movable in position relative to the spine 12 and the support limbs 14,16 in order to provide the required ground engaging support beneath the seating cavity 18.

In other embodiments of the present disclosure it is envisaged that the support frame 10 may include a pair of secondary wheels 30 to provide ground engaging support beneath the coupler 20 and one such embodiment is shown in FIGS. 9A and 9B.

The support frame 110 shown in FIGS. 9A and 9B is essentially the same as the support frame 10 shown in FIG. 1 and therefore the same reference numerals are used to identify corresponding parts of the support frame 110.

The support frame 110 shown in FIGS. 9A and 9B differs from the support frame 10 shown in FIG. 1 in that it omits the secondary wheel 30 mounted on the underside of the coupler 20. Instead the support frame 110 includes a pair of secondary support arms 124, each secondary support arm 124 carrying a secondary wheel 130 at one end.

Each secondary support arm 124 is pivotably connected midway along its length to a respective support arm 24 so as to locate the respective secondary wheel 130 to provide ground engaging support below the coupler 20.

The opposite ends of the secondary support arms 124 are pivotably interconnected by a pivot defining a moveable joint 63 (FIG. 10).

Movement of the support frame 110 between an erect configuration shown in FIGS. 9A and 9B to a collapsed configuration (not shown) is similar to the corresponding movement of the support frame 10. This movement is not therefore described again in detail with reference to the support frame 110 shown in FIGS. 9A and 9B.

However, the pivotable connection between the support arms 24 and the secondary support arms 124 means that pivotable movement of the support arms 24 relative to the coupler 20 results in pivotable movement of the secondary support arms 124 due to a scissor-type action between the pivotably connected support arms.

The secondary support arms 124 are therefore movable, with the support arms 24, from an erect configuration shown in FIG. 10 in which the secondary wheels 130 carried on the ends of the secondary support arms 124 are spaced from each other, via a partly collapsed configuration shown in FIG. 11A to a fully collapsed configuration shown in FIG. 11B in which the secondary wheels 130 are located adjacent each other.

In the collapsed configuration, each secondary support arm 124 is located adjacent and generally parallel to the support arm 24 with which it is pivotably connected. Consequently the overall size of the support frame 110 in its collapsed configuration is similar to that of the support frame 10 shown in FIG. 1, the main difference in size arising from the provision of two rather than one secondary wheel.

FIGS. 12 to 16 show a third embodiment of the collapsible frame 210 according to the present disclosure.

The support frame 210 includes an elongate spine 212 being curved to define a seating cavity 218 within the support frame 210 in which a flexible seat member seat 250 is located. The flexible seat member 250 comprises a seat portion 251, a back portion 252, two side portions 253 connected to the sides of the seat portion 251 and the back portion 252, a leg portion 254 connected to the seat portion 251 at a side remote of the back portion 252 and a connecting portion 255 connected to the back portion at a side remote of the seat portion 251.

The spine 212 is fixedly coupled at one end 212a to a coupler 220 and is coupled at its other end 212b to a handle assembly 222. The flexible seat member 250 is connected with ends 256 of the connecting portion 255 to the handle assembly 222 and with ends 257 of the leg portion 254 to the coupler 220. Along the sides of the connecting portion 255, the side portions 253 and the leg portion 254 ropes or cables may be provided for transmitting the load on the seat member 250 to the support frame 210. These flexible cables may extend from ends 256 to the ends 257 and be connected to the handle assembly 222 and the coupler 220 respectively. The flexible seat member 250 is illustratively made of fabric.

The support frame 210 also includes a pair of support arms 224 extending from the coupler 220. Each support arm 224 carrying a wheel 228 at one end and being pivotably coupled to the coupler 220 at its other end.

Figure 13:
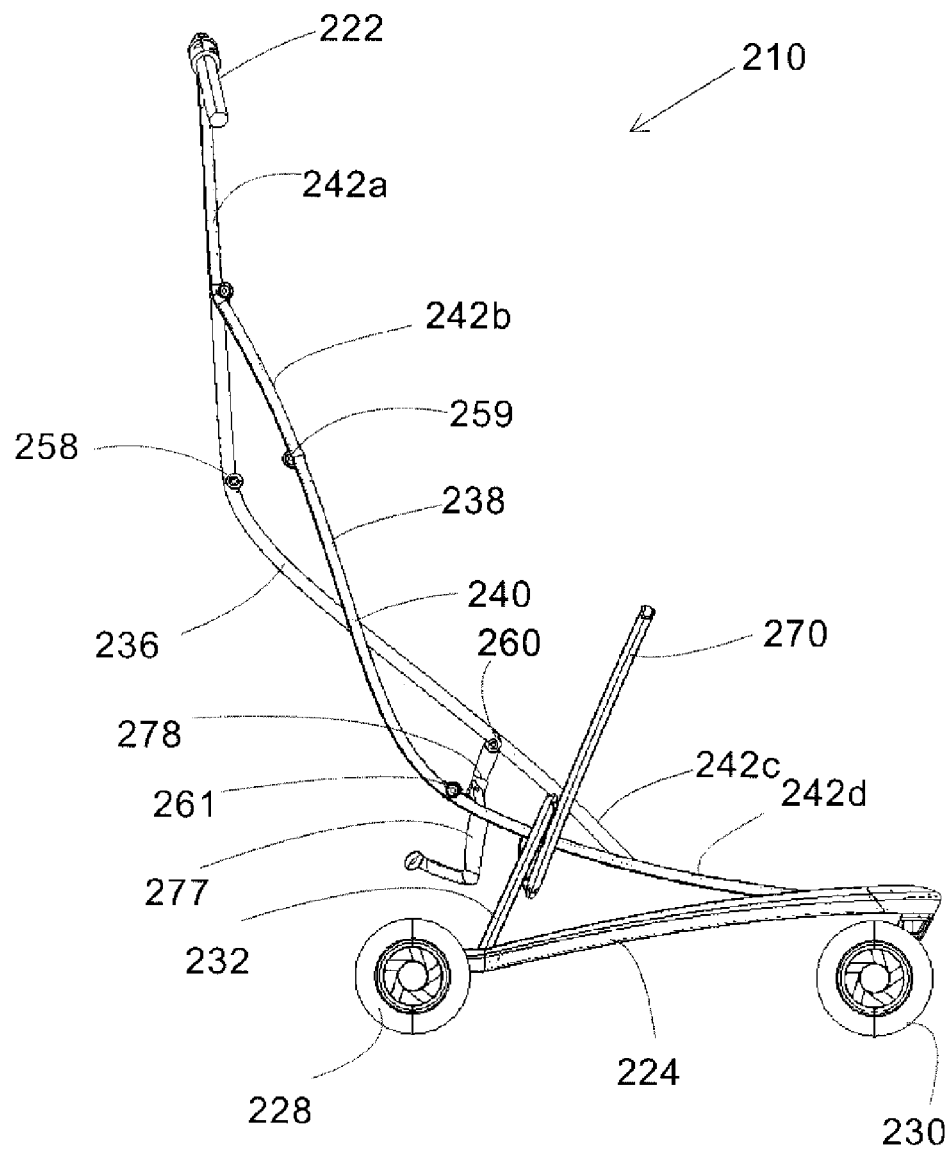
FIG. 13 shows a side view of the support frame of FIG. 12, without the seat member.

In an erect configuration of the support frame 210, as is shown in FIGS. 12 and 13, the support arms 224 are located relative to the coupler 220 so as space the wheels 228 from each other and provide ground engaging support below the seating cavity 218.

The support frame 210 also includes a secondary wheel 230 mounted on an underside of the coupler 220, which provides in use of the support frame 210 in its erect configuration, ground engaging support below the coupler 220.

Each of the support arms 224 is linked to the spine 212 by means of an elongate, rigid, spine link member 232 that is pivotably connected at one end to the support arm 224 and at its other end to the spine 212.

To assist in minimizing the size of the support frame when in its collapsed configuration, the rigid and subsidiary limb members of each support arm may be curved and, in the erect configuration of the respective support limb, define an arc on a common spherical surface.

In such an embodiment, the axis of each pivotable connection between the rigid and subsidiary limb members of each support limb illustratively extends through the point of origin of the common spherical surface of the support limb.

This relative configuration of the rigid and subsidiary limb members has been discovered to be advantageous in that it results in an arrangement that folds into a compact arrangement in its collapsed configuration whilst ensuring that the support frame is collapsible in a single movement.

Illustratively in such embodiments each limb link member and/or each support arm is also curved such that, in the erect configuration of the respective support limb, the radius of curvature of the limb link member and/or the support arm passes through the centre of origin of the common spherical surface of the support limb.

In such embodiments, the axis of each pivotable connection between these components and the respective support limb illustratively extends through the point of origin of the common spherical surface of the support limb.

Referring to FIGS. 12 to 16 the spine 212 includes first and second, elongate, rigid spine members 236,238 mutually interconnected at a pivot defining a moveable spine joint 240 lying part-way, illustratively half-way, along the length of each rigid spine member 236,238. The second, elongate, rigid spine member 238 is constituted by two spaced, parallel, rigid, sub-members such that the second rigid spine member 238 is bifurcated along its whole length and especially in the vicinity of the moveable joint 240.

Along the length of the second rigid spine member 238, the spacing between the sub-members is slightly greater than the (typically circular or ovaloid) diameter of the first rigid spine member 236 such that the moveable joint 240 may be constituted by a simple pivot pin that is fixed at either end to one of the sub-members and interconnects them so as to pass through an aperture extended from one side of the first elongate rigid spine member 236 to the other in order to define a pivotable joint of per se known construction.

Each of the elongate, rigid spine members 236,238 has pivotably connected at pivots 258, 259, 260, 261 thereto on each side of the moveable joint 240 a subsidiary spine member 242a-242d. Adjacent pairs of the subsidiary spine members 242a, 242b; 242c, 242d are pivotably secured together at pivots 262, 263 such that the spine 212 defines first and second closed loop kinematic linkages 244a, 244b. Second subsidiary spine member 242b is pivotably connected to the first subsidiary spine member 242a part-way along the length of the first subsidiary spine member 242a. Third subsidiary spine member 242c is pivotably connected to the fourth subsidiary spine member 242d part-way along the length of the fourth subsidiary spine member 242d.

The pivotable connections of the subsidiary spine members 242a-242d to the elongate rigid spine members 236,238 and to one another as appropriate are such that the movements of the members of the respective kinematic linkages 244a,244b are essentially uniplanar (subject to minor deflections caused by tolerancing of the pivotable joints and connections). The plane in which the spine 212 is located extends parallel to the normal forward driving direction of the pushchair. The plane is located centrally in support frame 210.

Figure 14A:
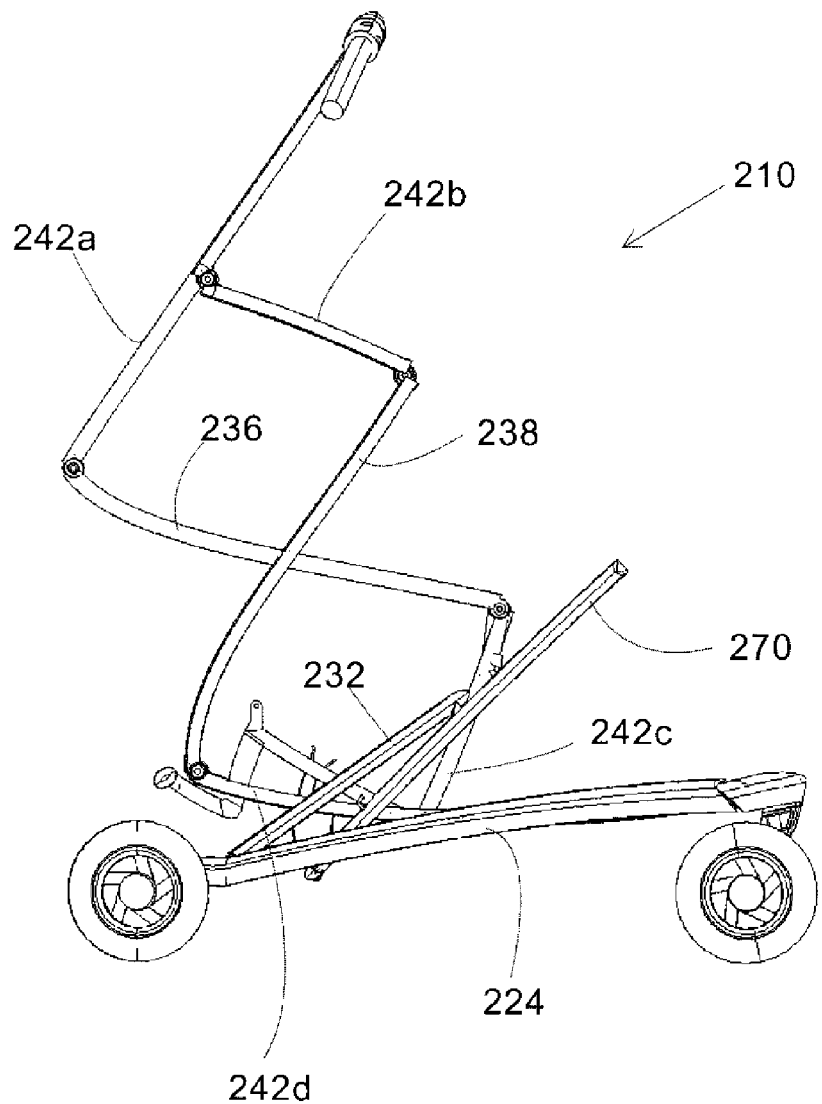
FIGS. 14A, 14B and 15 show a side view and perspective views of the support frame of FIG. 13 during movement from the erect configuration to a collapsed configuration.
Figure 14B:
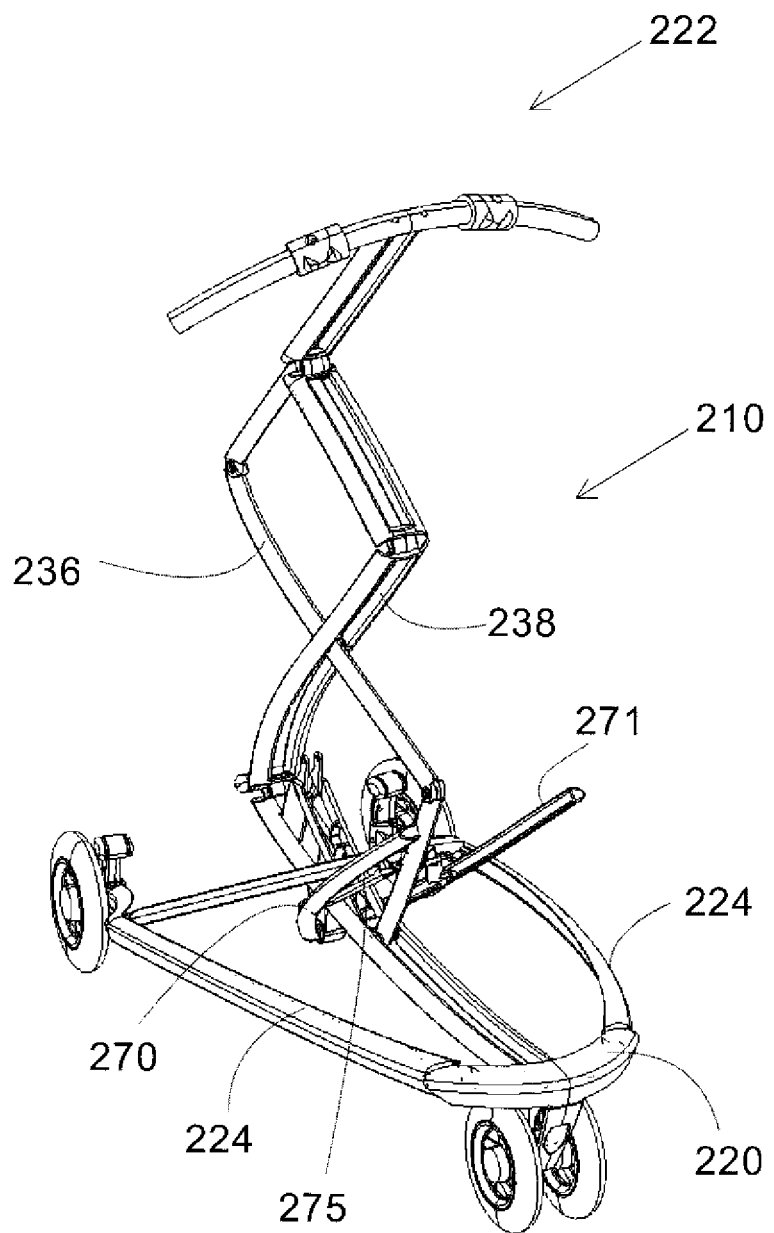
Figure 15:
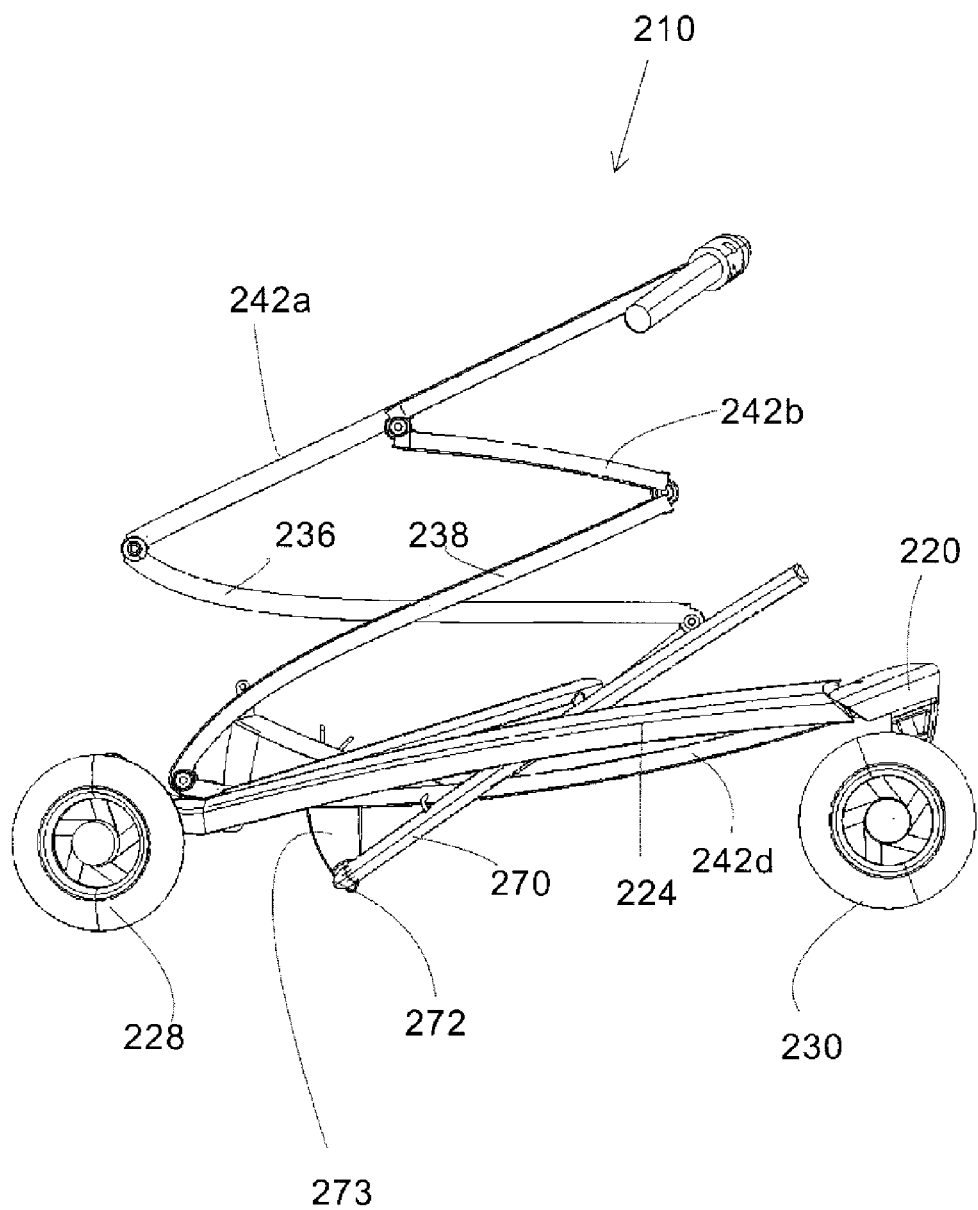
Figure 16:
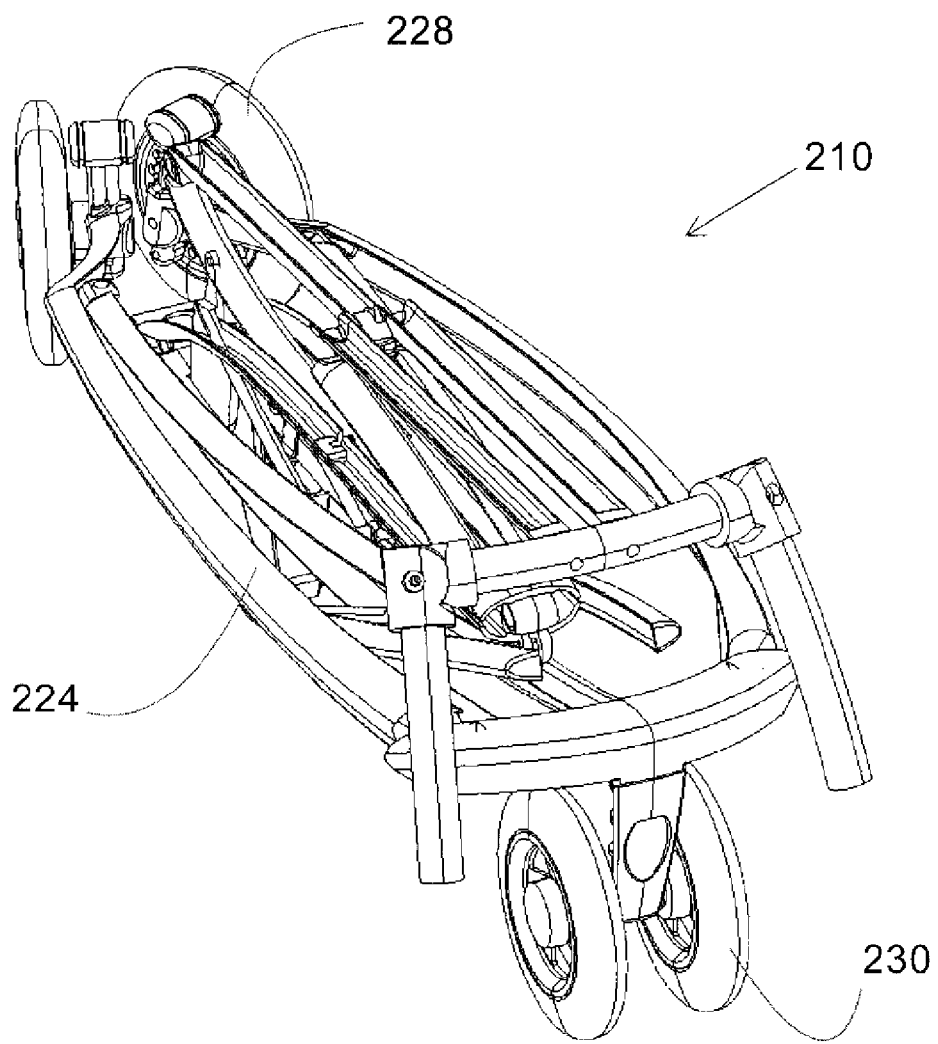
FIG. 16 shows a perspective view of the support frame of FIG. 13 in its collapsed configuration.

As a consequence the spine 212 is convertible between an erect configuration as shown in FIGS. 12 and 13 via a partly collapsed configuration shown in FIGS. 14A and 14B and via a further collapsed configuration as shown in FIG. 15 to a fully collapsed configuration as shown in FIG. 16.

Thus in the collapsed configuration of the spine 212 the rigid and subsidiary spine members lie generally parallel to and adjacent one another along their lengths as far as this is permitted by the shapes of the members and the positions of the various pivotable joints and connections.

In the erect configuration of the spine 212 the latter defines an extended arrangement as shown in FIGS. 12 and 13.

Each of the elongate, rigid, spine link members 232 is pivotally connected at one end to the respective support arm 224 and at its other end to the third subsidiary spine member 242c of the spine 212.

The fourth subsidiary spine members 242d is constituted by two spaced, parallel, rigid, sub-members in a similar manner to that described in relation to the second, elongate, rigid spine member 238 such that fourth subsidiary spine members 242d is bifurcated along its whole length and especially in the vicinity of the respective pivots.

Each of the rigid spine members 236,238 is curved such that, in the erect configuration of the spine 212, the pivotal interconnection defining the moveable spine joint 240 is an over centre pivot and automatically locks the spine 212 in its erect configuration.

The second third and fourth subsidiary spine members 242b, 242c and 242d are also curved to define the curved shape of the spine 212 in its erect configuration.

In this particular embodiment the first subsidiary spine members 242a is straight. It is envisaged in other embodiments however that this subsidiary spine member 242a may also be curved.

As best seen in FIGS. 12 and 14B the support frame 210 comprises first and second elongate, rigid, seat link members 270, 271 interconnected at a pivot defining a joint 272. The joint 272 is located on a plate 273 mounted on the fourth subsidiary spine member 242d (see FIG. 15). At ends remote of the joint 72 the seat link members 270, 271 are connected to parts 274 of the side portions 253, thereby keeping the side portions 253 in its desired positions.

The support frame 210 comprises first and second elongate, rigid, subsidiary seat link members 275, 276 being pivotably connected with first ends to the seat link members 270, 271 and with second ends to the spine link members 232. Due to the subsidiary seat link members 275, 276 the seat link members 270, 271 and therefor the parts 274 of the side portions 253 of the flexible seat member 250 will be moved towards each other when collapsing the support frame 210.

In order to retain the spine 212 in its erect configuration, and prevent unwanted movement from its erect configuration to its collapsed configuration, the support frame 210 includes a lock assembly comprising first and second lock elements 277, 278 connected respectively to the fourth subsidiary spine member 242d and the first spine members 236. (see FIG. 13)

The first and second lock elements 277, 278 co-operate on movement of the spine 212 into its erect configuration to releasably lock the spine 212 in its erect condition.

The first and second lock elements 277, 278 of each lock assembly illustratively include snap-fittingly engageable members that are disengageable manually by pulling the pivotable connections apart.

In other embodiments, it is envisaged that an actuator may form part of the handle assembly 222 that permits remote release of the lock assembly.

The handle assembly 222 includes a pair of elongate handle sections 279, 280 rigidly connected to the spine 212. The handle assembly 222 includes further handle section 281, 282 pivotably connected at the handle sections 279, 280.

The load of an infant seated in the flexible seat member 250 acts directly on the spine 212 and the seat link members 270, 271 and push it apart. The directionality of the load acts in an opposite direction to the forces required to collapse the spine 212.

In order to collapse the support frame 210 from its erect configuration (FIG. 12) to its collapsed configuration (FIG. 16), a user must disengage the lock elements of the lock assembly. The user must then push the handle assembly 222 in the forward direction towards the coupler 222.

These unlocking movements commences movement of the spine 212 from its erect configuration to its collapsed configuration, which in turn causes movement of the support arms 224, the subsidiary seat link members 275, 276 and the seat link members 270, 271. Further movement of the support frame 210 from its erect configuration to its collapsed configuration may be achieved by pushing the pivotable connection between the spine 212 and the handle assembly 222 toward the coupler 220, which may be effected in a one-handed operation.

The pivotable connections between the individual components of the support frame 210 means that the support frame 210 moves to its collapsed configuration in a single movement.

As is also readily apparent from FIG. 16 in the collapsed configuration of the support frame 210 the spine members 236, 238 and the subsidiary spine members 242a-242d lie generally parallel to and adjacent one another along their lengths as far as this permitted by the shapes of the members and the positions of the various pivotable joints and connections. This results in a reduction in the length of the spine to one third of its length in its erect configuration.

Figure 17:
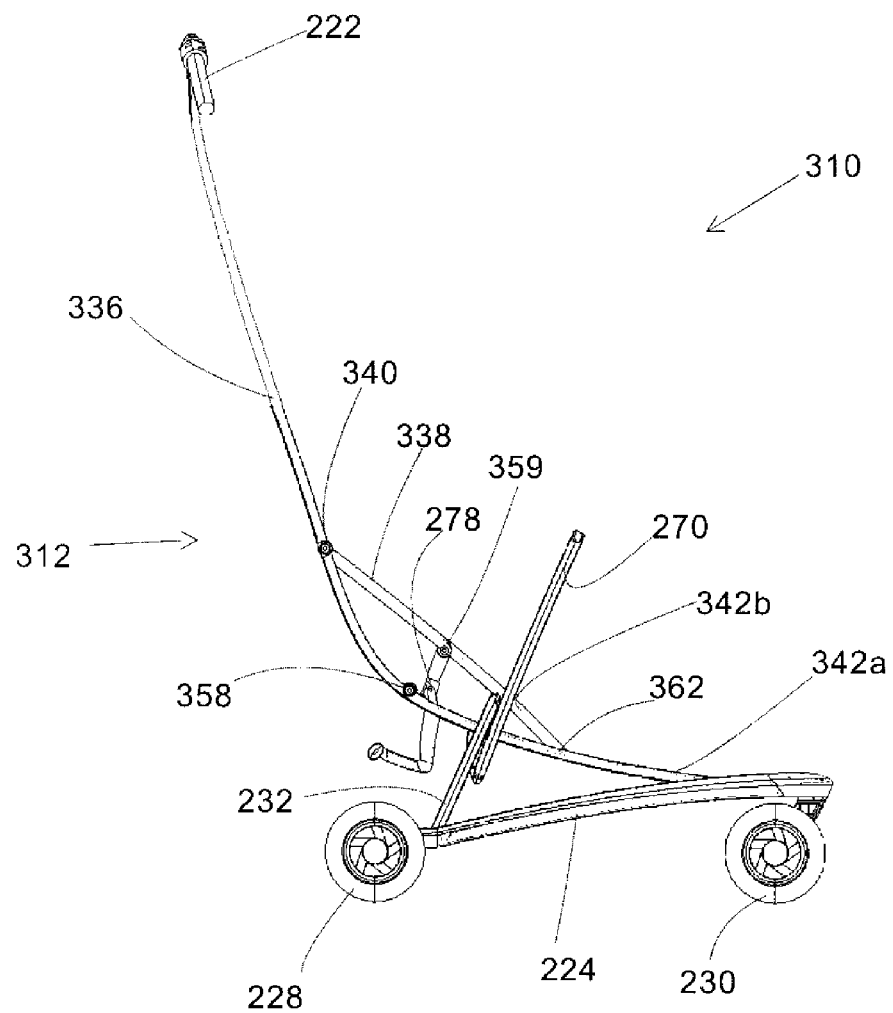
FIG. 17 show a perspective view of a support frame with seat member according to a fourth embodiment of the present disclosure in an erect configuration.
Figure 18:
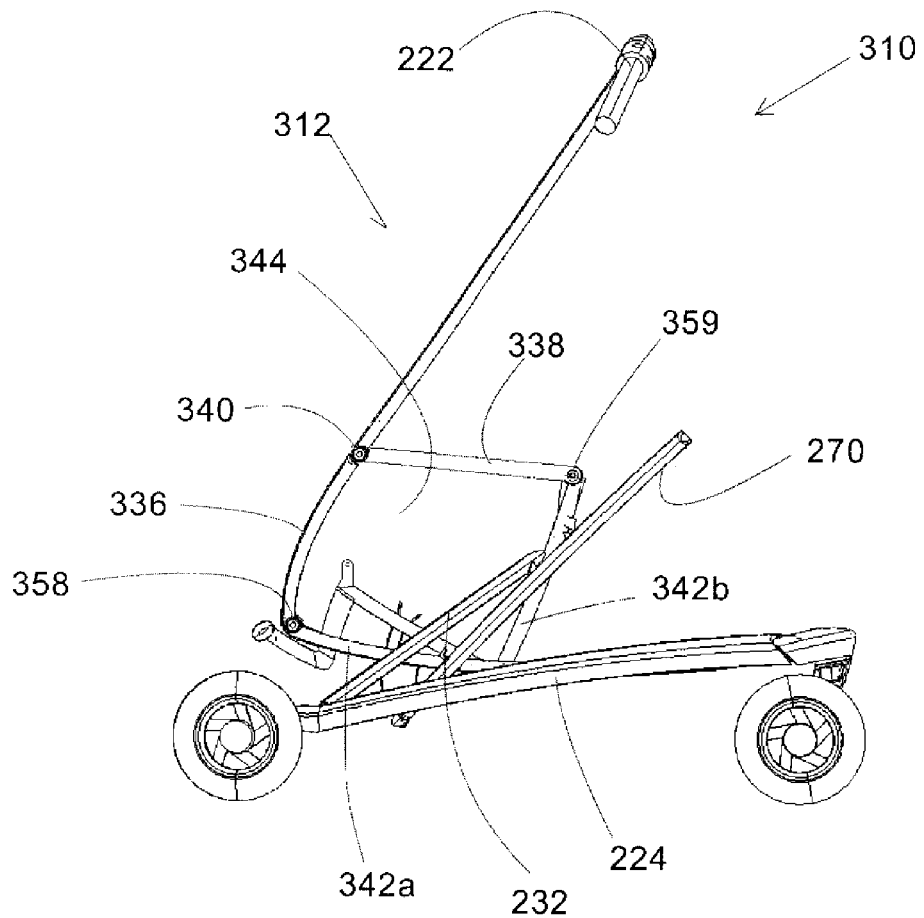
FIG. 18 show a side view of the support frame of FIG. 17 during movement from the erect configuration to a collapsed configuration.

FIGS. 17 and 18 show a side view of a fourth embodiment of a support frame 310 according to the present disclosure. The support frame 310 is identical to the support frame 210 except for the spine 312. The spine 312 includes first and second, elongate, rigid spine members 336,338 mutually interconnected at a pivot defining a moveable spine joint 340 lying part-way along the length of the rigid spine member 236. The rigid spine member 338 is pivotably connected with one end to the movable joint 340. The second, elongate, rigid spine member 338 is constituted by two spaced, parallel, rigid, sub-members such that the second rigid spine member 338 is bifurcated along its whole length and especially in the vicinity of the moveable joint 340.

Along the length of the second rigid spine member 338, the spacing between the sub-members is slightly greater than the (typically circular or ovaloid) diameter of the first rigid spine member 336 such that the moveable joint 340 may be constituted by a simple pivot pin that is fixed at either end to one of the sub-members and interconnects them so as to pass through an aperture extended from one side of the first elongate rigid spine member 336 to the other in order to define a pivotable joint of per se known construction.

Each of the elongate, rigid spine members 336,338 has pivotably connected at pivots 358, 359 thereto on only one side of the moveable joint 340 a subsidiary spine member 342a, 3242b. The subsidiary spine members 342a, 342b are pivotably secured together at pivot 362 such that the spine 312 defines one single closed loop kinematic linkage 344. Second subsidiary spine member 342b is pivotably connected to the first subsidiary spine member 342a part-way along the length of the first subsidiary spine member 342a.

The pivotable connections of the subsidiary spine members 342a,342b to the elongate rigid spine members 336,338 and to one another as appropriate are such that the movements of the members of the single kinematic linkage 344 is essentially uniplanar (subject to minor deflections caused by tolerancing of the pivotable joints and connections). The plane in which the spine 312 is located extends parallel to the normal forward driving direction of the pushchair. The plane is located centrally in support frame 310.

As a consequence the spine 312 is convertible between an erect configuration as shown in FIG. 17 and via a partly collapsed configuration shown in FIG. 18 to a fully collapsed configuration.

It is also possible to use support arms which are not pivotable to each other.

It is also possible that the spine comprises only one or more kinematic linkages.

It is also possible to use a rigid seat shell which will be only supported by seat link members 270, 271.

However, it is also possible that the support frame 212 does not comprises seat link members 270, 271 but that the seat member is only attached to the spine 212 itself.

The invention claimed is:

1. A collapsible support frame for an infant pushchair, the support frame having a width and comprising at least an elongate spine located substantially centrally with respect to the width of the support frame, the width of the support frame being substantially transverse to the elongate spine, and a seating cavity within the support frame in which to receive a seat, the elongate spine being coupled at or towards one end of the elongate spine to a coupler and at or towards the other end of the elongate spine to a handle assembly, characterized in that, the spine comprises at least first and second, elongate, rigid spine members mutually interconnected at a pivot defining a moveable spine joint lying part-way along the length of at least one rigid spine member and, on at least one side of the moveable spine joint, subsidiary spine members each pivotably connected to one of the rigid spine members, the subsidiary spine members being pivotably secured together remote of the movable spine joint such that the spine defines at least one closed loop kinematic linkage being moveable between an erect configuration in which the rigid spine members and subsidiary spine members diverge and a collapsed configuration in which the rigid spine members and subsidiary spine members generally lie adjacent one another along their lengths, the connections of the rigid spine members and subsidiary spine members being such that the closed loop kinematic linkage is uniplanar, wherein the first and second rigid spine members are curved such that, in the erect configuration of the spine, the pivotal interconnection defining the moveable spine joint is an over centre pivot and locks the spine in its erect configuration.

2. A collapsible support frame according to claim 1, characterized in that, the elongate spine is centrally located between, and coupled at or towards each end to a pair of elongate support limbs, the spine being coupled at or towards one end to the support limbs via the coupler and at or towards its other end to the support limbs via the handle assembly, wherein the spine and support limbs are foldable such that the support frame is collapsible in a single movement from its erect configuration into a collapsed configuration in which the spine and support limbs are folded to lie adjacent each other.

3. A collapsible support frame according to claim 2, characterized in that each support limb comprises first and second, elongate, rigid limb members interconnected at a pivot defining a moveable limb joint and, on each side of the moveable limb joint, a subsidiary limb member pivotably connected to each of the rigid limb members part-way along the length of the respective rigid limb member, the subsidiary limb members being pivotably secured together such that each support limb defines a closed loop kinematic linkage and is moveable between an erect configuration in which the rigid limb members diverge and a collapsed configuration in which the rigid limb members and subsidiary limb members lie adjacent one another along their lengths.

4. A collapsible support frame according to claim 2, characterized in that the support frame comprises a pair of support arms extending from the coupler, each support arm carrying a wheel at or towards one end and being pivotably coupled to the coupler at its other end, the wheels in use of the support frame in its erect configuration being spaced from each other and providing ground engaging support below the seating cavity, wherein the spine is foldable and each support arm is linked to the spine such that the support frame is collapsible in a single movement from its erect configuration into a collapsed configuration in which the support arms are pivoted relative to the coupler to locate the wheels adjacent each other, and the spine is folded to lie adjacent the support arms, and each support arm is linked to a respective support limb by means of an elongate, rigid, limb link member.

5. A collapsible support frame according to claim 2, characterized in that, the handle assembly comprises a pair of elongate handle sections, each handle section being pivotably connected at one end to the spine and at its other end to a respective support limb.

6. A collapsible support frame according to claim 2, characterized in that, the support frame comprises a flexible seat member secured to and interconnecting the support limbs so as to define a seat within the seating cavity in the erect configuration of the support frame.

7. A collapsible support frame according to claim 1, characterized in that, the collapsible support frame comprises a flexible seat member secured to the handle assembly and the coupler so as to define a seat within the seating cavity in the erect configuration of the support frame.

8. A collapsible support according to claim 7, characterized in that, the support frame comprises seat link members each pivotably connected at or towards one end to the spine at a location between the coupler and the handle assembly and connected at or towards its other end to a side of the flexible seat member.

9. A collapsible support frame according to claim 8, characterized in that, in the collapsed configuration of the support frame the seat link members are pivoted with respect to the spine to lie adjacent each other.

10. A collapsible support frame according to claim 1, characterized in that the moveable spine joint lying part-way along the length of the first and second, elongate, rigid spine members and, on each side of the moveable spine joint, subsidiary spine members are each pivotably connected to each of the rigid spine members, pairs of subsidiary spine members being pivotably secured together remote of the movable spine joint such that the spine defines first and second closed loop kinematic linkages lying respectively to either side of the moveable spine joint and is moveable between an erect configuration in which the rigid spine members and subsidiary spine members diverge and a collapsed configuration in which the rigid spine members and subsidiary spine members generally lie adjacent one another along their lengths, the connections of the rigid spine members and subsidiary spine members being such that the first and second closed loop kinematic linkages are uniplanar.

11. A collapsible support frame according to claim 1, characterized in that, on a first side of the moveable spine joint first and second subsidiary spine members are respectively connected at one end to ends of the first and second rigid spine members and the opposite end of the second subsidiary spine member is pivotably connected to the first subsidiary spine member part-way along the length of the first subsidiary spine member and on a second side of the moveable spine joint third and fourth subsidiary spine members are respectively connected at one end to opposite ends of the first and second rigid spine members and the opposite end of the third subsidiary spine member is pivotably connected to the fourth subsidiary spine member part-way along the length of the fourth subsidiary spine member.

12. A collapsible support frame for an infant pushchair, the support frame having a width and comprising at least an elongate spine located substantially centrally with respect to the width of the support frame, the width of the support frame being substantially transverse to the elongate spine, and a seating cavity within the support frame in which to receive a seat, the elongate spine being coupled at or towards one end of the elongate spine to a coupler and at or towards the other end of the elongate spine to a handle assembly, characterized in that, the spine comprises at least first and second, elongate, rigid spine members mutually interconnected at a pivot defining a moveable spine joint lying part-way along the length of at least one rigid spine member and, on at least one side of the moveable spine joint, subsidiary spine members each pivotably connected to one of the rigid spine members, the subsidiary spine members being pivotably secured together remote of the movable spine joint such that the spine defines at least one closed loop kinematic linkage being moveable between an erect configuration in which the rigid spine members and subsidiary spine members diverge and a collapsed configuration in which the rigid spine members and subsidiary spine members generally lie adjacent one another along their lengths, the connections of the rigid spine members and subsidiary spine members being such that the closed loop kinematic linkage is uniplanar, wherein the support frame comprises a pair of support arms extending from the coupler, each support arm carrying a wheel at or towards one end and being pivotably coupled to the coupler at its other end, the wheels in use of the support frame in its erect configuration being spaced from each other and providing ground engaging support below the seating cavity, wherein the spine is foldable and each support arm is linked to the spine such that the support frame is collapsible in a single movement from its erect configuration into a collapsed configuration in which the support arms are pivoted relative to the coupler to locate the wheels adjacent each other, and the spine is folded to lie adjacent the support arms.

13. A collapsible support frame according to claim 12, characterized in that, each support arm is linked to the spine by means of an elongate, rigid, spine link member.

14. A collapsible support frame according to claim 13, characterized in that, each spine link member is pivotably connected between the spine and the respective support arm so as to pull the support arm towards the spine on movement of the spine from its erect configuration to its collapsed configuration and to push the support arm away from the spine on movement of the spine from its collapsed configuration to its erect configuration.

15. A collapsible support frame according to claim 12, characterized in that the support frame comprises a pair of secondary support arms, the secondary support arms being pivotably attached to each other at or towards one end and each of the secondary support arms carrying a secondary wheel at or towards its other end, each secondary arm being pivotably attached at or towards its mid point to a respective one of the support arms such that, in use of the support frame in its erect configuration, the secondary wheels provide ground engaging support below the coupler and, on movement of the support frame from its erect configuration into its collapsed configuration, pivoting movement of the support arms relative to the coupler causes pivotal movement of each of the secondary support arms relative to the respective support arm to locate the secondary wheels adjacent each other and locate each secondary support arm adjacent the respective support arm.

16. A collapsible support frame particularly for an infant pushchair, the support frame in an erect configuration comprises at least a centrally located elongate spine and a seating cavity within the support frame in which to receive a seat, the spine being coupled at or towards one end to a coupler and at or towards its other end to a handle assembly, characterized in that, the spine comprises at least first and second, elongate, rigid spine members mutually interconnected at a pivot defining a moveable spine joint lying part-way along the length of at least one rigid spine member and, on at least one side of the moveable spine joint, subsidiary spine members each pivotably connected to one of the rigid spine members, the subsidiary spine members being pivotably secured together remote of the movable spine joint such that the spine defines at least one closed loop kinematic linkage being moveable between an erect configuration in which the rigid spine members and subsidiary spine members diverge and a collapsed configuration in which the rigid spine members and subsidiary spine members generally lie adjacent one another along their lengths, the connections of the rigid spine members and subsidiary spine members being such that the closed loop kinematic linkage is uniplanar; and characterized in that the first and second rigid spine members are curved such that, in the erect configuration of the spine, the pivotal interconnection defining the moveable spine joint is an over centre pivot and locks the spine in its erect configuration.

17. A collapsible support frame for an infant pushchair, the support frame having a width and comprising at least an elongate spine located substantially centrally with respect to the width of the support frame, the width of the support frame being substantially transverse to the elongate spine, and a seating cavity within the support frame in which to receive a seat, the elongate spine being coupled at or towards one end of the elongate spine to a coupler and at or towards the other end of the elongate spine to a handle assembly, characterized in that, the spine comprises at least first and second, elongate, rigid spine members mutually interconnected at a pivot defining a moveable spine joint lying part-way along the length of at least one rigid spine member and, on at least one side of the moveable spine joint, subsidiary spine members each pivotably connected to one of the rigid spine members, the subsidiary spine members being pivotably secured together remote of the movable spine joint such that the spine defines at least one closed loop kinematic linkage being moveable between an erect configuration in which the rigid spine members and subsidiary spine members diverge and a collapsed configuration in which the rigid spine members and subsidiary spine members generally lie adjacent one another along their lengths, the connections of the rigid spine members and subsidiary spine members being such that the closed loop kinematic linkage is uniplanar, wherein the collapsible support frame comprises a flexible seat member secured to the handle assembly and the coupler so as to define a seat within the seating cavity in the erect configuration of the support frame, and the handle assembly comprises a pair of elongate handle sections, each handle section being pivotably connected at one end to the spine and at its other end to the flexible seat member.

18. A collapsible support frame for an infant pushchair, the support frame having a width and comprising at least an elongate spine located substantially centrally with respect to the width of the support frame, the width of the support frame being substantially transverse to the elongate spine, and a seating cavity within the support frame in which to receive a seat, the elongate spine being coupled at or towards one end of the elongate spine to a coupler and at or towards the other end of the elongate spine to a handle assembly, characterized in that, the spine comprises at least first and second, elongate, rigid spine members mutually interconnected at a pivot defining a moveable spine joint lying part-way along the length of at least one rigid spine member and, on at least one side of the moveable spine joint, subsidiary spine members each pivotably connected to one of the rigid spine members, the subsidiary spine members being pivotably secured together remote of the movable spine joint such that the spine defines at least one closed loop kinematic linkage being moveable between an erect configuration in which the rigid spine members and subsidiary spine members diverge and a collapsed configuration in which the rigid spine members and subsidiary spine members generally lie adjacent one another along their lengths, the connections of the rigid spine members and subsidiary spine members being such that the closed loop kinematic linkage is uniplanar, wherein the support frame comprises a secondary wheel mounted on the coupler to provide, in use of the support frame in its erect configuration, ground engaging support below the coupler.

* * * * *